(12) United States Patent
Ueno et al.

(10) Patent No.: US 6,758,038 B2
(45) Date of Patent: Jul. 6, 2004

(54) TEMPERATURE ESTIMATING APPARATUS FOR INTERNAL COMBUSTION ENGINE

(75) Inventors: Masaki Ueno, Saitama-ken (JP); Yoshihisa Iwaki, Saitama-ken (JP); Masahiro Sato, Saitama-ken (JP); Hideharu Yamazaki, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/233,683

(22) Filed: Sep. 4, 2002

(65) Prior Publication Data
US 2003/0056501 A1 Mar. 27, 2003

(30) Foreign Application Priority Data
Sep. 5, 2001 (JP) ........................................ 2001-269332

(51) Int. Cl.$^7$ ................................................. F01N 3/00
(52) U.S. Cl. ............................ 60/297; 60/277; 60/284; 60/287; 60/291
(58) Field of Search ........................ 60/276, 277, 284, 60/286, 287, 288, 289, 292, 295, 297, 300, 303, 278

(56) References Cited

U.S. PATENT DOCUMENTS 5,595,060 A * 1/1997 Togai et al. ................. 60/274
6,357,227 B1 * 3/2002 Neufert ........................ 60/309
6,422,006 B2 * 7/2002 Ohmori et al. ............... 60/297
6,477,830 B2 * 11/2002 Takakura et al. ............. 60/277
6,581,370 B2 * 6/2003 Sato et al. .................... 60/277
2003/0056496 A1 * 3/2003 Ueno et al. ................... 60/277

FOREIGN PATENT DOCUMENTS

JP 4054807 * 10/1993 ................. 60/287

* cited by examiner

*Primary Examiner*—Binh Tran
(74) *Attorney, Agent, or Firm*—Armstrong, Kratz, Quintos, Hanson & Brooks, LLP

(57) ABSTRACT

A temperature estimating apparatus for an internal combustion engine is provided for correctly calculating the temperature of an exhaust device even when the internal combustion engine is started under low temperature conditions. The temperature estimating apparatus comprises an ECU for estimating the temperature of a hydrocarbon adsorbent in an exhaust system of the internal combustion engine through calculations. The ECU calculates an estimated adsorbent temperature of the adsorbent in accordance with an engine rotational speed, an absolute intake pipe inner pressure, an engine water temperature, an intake temperature, and a detected humidity of exhaust gases. This calculation is started when condensation, which has occurred within an intake pipe, is eliminated.

6 Claims, 17 Drawing Sheets

$T_A$: EXTERNAL TEMPERATURE $V$: EXHAUST GAS TEMPERATURE $T_W(z, t)$: TEMPERATURE OF EXHAUST PIPE WALL ELEMENT $T_G(z, t)$: TEMPERATURE OF EXHAUST GAS ELEMENT

FIG. 4

- FOR EXHAUST GASES $$S_G \rho_G c_G \left(\frac{\partial T_G}{\partial t} + V \frac{\partial T_G}{\partial z}\right) = \alpha_1 U (T_W - T_G) \qquad \cdots (1)$$

- FOR WALL OF EXHAUST PIPE $$S_W \rho_W c_W \frac{\partial T_W}{\partial t} = \alpha_1 U (T_G - T_W) + \alpha_2 U (T_A - T_W) \qquad \cdots (2)$$

WHERE
- $\rho_G$ : EXHAUST GAS DENSITY [kg/m³]
- $S_G$ : CROSS-SECTIONAL AREA OF EXHAUST GAS FLOW PASSAGE [m²]
- $c_G$ : SPECIFIC HEAT OF EXHAUST GASES [J/(kg·K)]
- $\rho_W$ : EXHAUST PIPE WALL DENSITY [kg/m³]
- $S_W$ : CROSS-SECTIONAL AREA OF EXHAUST PIPE WALL [m²]
- $c_W$ : SPECIFIC HEAT OF EXHAUST PIPE WALL [J/(kg·K)]
- $t$ : TIME [s]
- $\alpha_1$ : THERMAL CONDUCTIVITY BETWEEN EXHAUST GAS - EXHAUST PIPE WALL [W/(m²·K)]
- $\alpha_2$ : THERMAL CONDUCTIVITY BETWEEN EXHAUST PIPE WALL - EXTERNAL AIR [W/(m²·K)]
- $U$ : LENGTH OF INNER PERIPHERY OF EXHAUST PIPE FLOW PASSAGE [m]
- $T_W$ : EXHAUST PIPE WALL TEMPERATURE [K]
- $T_G$ : EXHAUST GAS TEMPERATURE [K]
- $T_A$ : EXTERNAL TEMPERATURE [K]
- $V$ : EXHAUST GAS RATE [m/s]

FIG. 5

$$\frac{\partial \theta_G}{\partial t} + v \frac{\partial \theta_G}{\partial x} = a(\theta_W - \theta_G) \quad \cdots (3)$$

$$\frac{\partial \theta_W}{\partial t} = b(\theta_G - \theta_W) + c(\theta_A - \theta_W) \quad \cdots (4)$$

WHERE $$x = \frac{z}{L_s}, \quad v = \frac{V}{L_s}, \quad \theta_G = \frac{T_G}{T_s}, \quad \theta_W = \frac{T_W}{T_s}, \quad \theta_A = \frac{T_A}{T_s},$$

$$a = \frac{\alpha_1 U}{S_G \rho_G c_G}, \quad b = \frac{\alpha_1 U}{S_W \rho_W c_W}, \quad c = \frac{\alpha_2 U}{S_W \rho_W c_W}$$

$L_s$ : REFERENCE LENGTH FOR DIMENSIONLESS FORM [m]
$T_s$ : REFERENCE TEMPERATURE FOR DIMENSIONLESS FORM [K]
$\theta_W$ : DIMENSIONLESS TEMPERATURE CONVERTED VALUE
  OF EXHAUST PIPE WALL TEMPERATURE
$\theta_G$ : DIMENSIONLESS TEMPERATURE CONVERTED VALUE
  OF EXHAUST GAS TEMPERATURE
$\theta_A$ : DIMENSIONLESS TEMPERATURE CONVERTED VALUE
  OF EXTERNAL TEMPERATURE
$x$ : DIMENSIONLESS LENGTH
$v$ : DIMENSIONLESS VELOCITY
$a, b, c$ : MODEL PARAMETERS $$\frac{\theta_G(t+\Delta t, x) - \theta_G(t, x)}{\Delta t} + v \cdot \frac{\theta_G(t, x) - \theta_G(t, x-\Delta x)}{\Delta x} = a \cdot \{\theta_W(t, x) - \theta_G(t, x)\}$$

$$\cdots (5)$$

$$\frac{\theta_W(t+\Delta t, x) - \theta_W(t, x)}{\Delta t} = b \cdot \{\theta_G(t, x) - \theta_W(t, x)\} + c \cdot \{\theta_A - \theta_W(t, x)\}$$

$$\cdots (6)$$

$$\theta_G(t+\Delta t, x) = \theta_G(t, x) - v \cdot \frac{\Delta t}{\Delta x} \cdot \{\theta_G(t, x) - \theta_G(t, x-\Delta x)\}$$
$$+ a \cdot \Delta t \cdot \{\theta_W(t, x) - \theta_G(t, x)\} \quad \cdots (7)$$

$$\theta_W(t+\Delta t, x) = \theta_W(t, x) + b \cdot \Delta t \cdot \{\theta_G(t, x) - \theta_W(t, x)\} + c \cdot \Delta t \cdot \{\theta_A - \theta_W(t, x)\}$$

$$\cdots (8)$$

F I G. 9
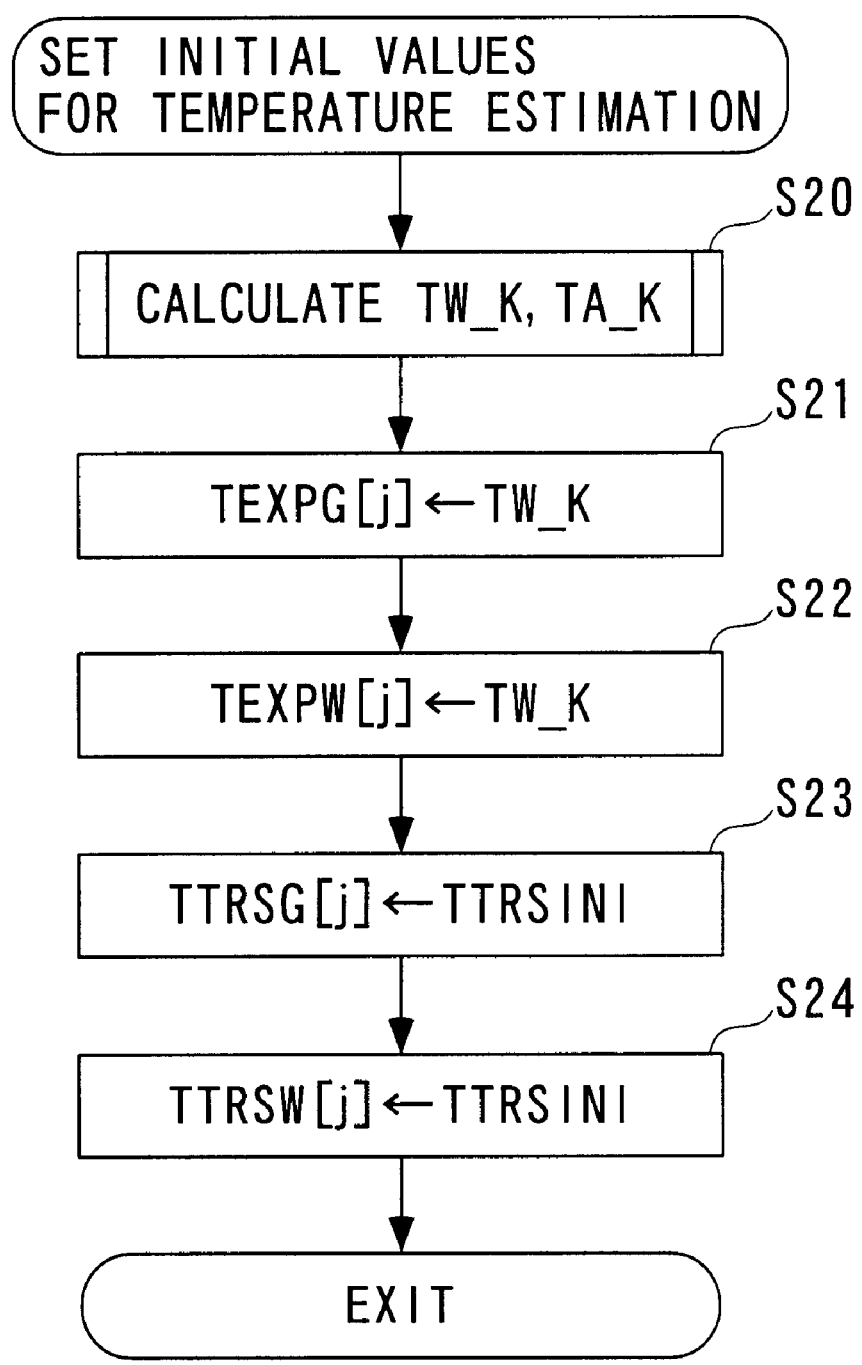

F I G. 1 1
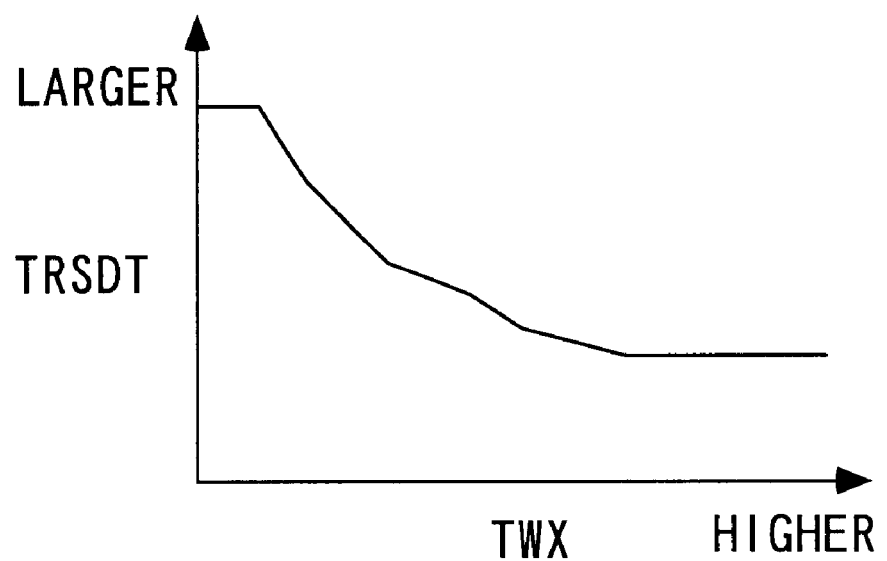

TEMPERATURE ESTIMATING APPARATUS FOR INTERNAL COMBUSTION ENGINE

BACKGROUND OF THE INVENTION

1. Field of the Invention

The present invention relates to a temperature estimating apparatus for an internal combustion engine which estimates the temperature of an exhaust device such as a catalyzer arranged in an exhaust system through calculations.

2. Description of the Related Art

Conventionally, one type of known temperature estimating apparatus mentioned above thermodynamically calculates the temperature of an exhaust device in an exhaust system of an internal combustion engine. More specifically, the exhaust device is thermodynamically modeled to estimate a heat exchanging state between the exhaust device and exhaust gases to calculate the temperature of the exhaust device. The temperature of the exhaust device is estimated in this manner because a detecting device such as a temperature sensor is relatively expensive to manufacture, in addition to its low reliability. Thus, the temperature estimating apparatus avoids such problems in order to increase reliability in detecting the temperature and to reduce the manufacturing cost.

The conventional temperature estimating apparatus could fail to correctly calculate the temperature of the exhaust device when the internal combustion engine is started under a low temperature condition for the reasons set forth below. When the internal combustion engine is started at a low ambient temperature which causes a cold exhaust pipe in an exhaust system, the saturated steam pressure of exhaust gases becomes lower associated with a reduction in the temperature of the exhaust gases passing through the exhaust device, thereby possibly resulting in condensation of moisture contained in the exhaust gases on wall surfaces of the exhaust device. In this event, heat applied from the exhaust gases to condensed water is consumed for a phase change from the condensed water to stream as latent heat of vaporization, so that the exhaust device does not change in temperature. It is therefore necessary to calculate the temperature of the exhaust device in consideration of the influence of the condensed water thus produced. However, because the amount of condensed water thus produced, and a situation in which the condensed water is produced depend on external environmental conditions and an operating condition of the internal combustion engine upon starting, it is difficult to correctly reflect the influence of condensed water to the thermodynamic model as a result of difficulties in measurements and calculations. Consequently, the temperature of the exhaust device can be incorrectly calculated when the internal combustion engine is started under low temperature conditions.

SUMMARY OF THE INVENTION

The present invention has been made to solve the problem as mentioned above, and it is an object of the present invention to provide a temperature estimating apparatus for an internal combustion engine which is capable of correctly calculating the temperature of an exhaust device even when the internal combustion engine is started under low temperature conditions.

To achieve the above object, the present invention provides a temperature estimating apparatus for an internal combustion engine arranged in an exhaust system of the internal combustion engine for estimating a temperature of an exhaust device for purifying exhaust gases through calculations. The temperature estimating apparatus includes an operating condition detecting means for detecting an operating condition of the internal combustion engine, including a state of intake air; a humidity detecting means for detecting the humidity of exhaust gases; and a device temperature calculating means for calculating the temperature of the exhaust device in accordance with the detected operating condition of the internal combustion engine and the detected humidity of the exhaust gases.

As described above, when the temperature of an exhaust device is calculated by a technique of thermodynamically modeling the exhaust device, condensation of moisture in exhaust gases could cause an incorrectly calculated temperature of the exhaust device when the temperature of the exhaust system is low as a result of a low external temperature. In contrast, the temperature estimating apparatus for an internal combustion engine of the present invention calculates the temperature of the exhaust device in accordance with a detected operating condition of the internal combustion engine, including the state of intake air, and the humidity of exhaust gases in the exhaust system. Therefore, even when condensation is highly likely to occur as a result of a low external temperature, the temperature of the exhaust gas is calculated only when exhaust gases have a low humidity and are free from condensation, thereby making it possible to calculate the temperature of the exhaust device while avoiding the influence of the condensation. As a result, the temperature estimating apparatus for an internal combustion engine of the present invention can correctly calculate and estimate the temperature of the exhaust device even when the internal combustion engine is started under a low temperature condition.

Preferably, the temperature estimating apparatus for an internal combustion engine further includes condensation determining means for determining whether or not condensation occurs within the exhaust system in accordance with the detected humidity of the exhaust gases, wherein the device temperature calculating means calculates the temperature of the exhaust device further in accordance with a result of determination made by the condensation determining means.

According to this preferred embodiment of the temperature estimating apparatus for an internal combustion engine, the temperature of the exhaust device can be correctly estimated, while securely avoiding the influence of condensation, by calculating the temperature of the exhaust device only when no condensation occurs within the exhaust system in accordance with the result of determination made by the condensation determining means.

Preferably, the temperature estimating apparatus for an internal combustion engine further includes calculation start timing determining means for determining a timing for start calculating the temperature of the exhaust device by the device temperature calculating means in accordance with the result of determination made by the condensation determining means.

According to this preferred embodiment of the temperature estimating apparatus for an internal combustion engine, because the device temperature calculating means can start the calculation of the temperature of the exhaust device when no condensation occurs within the exhaust system, it is possible to start calculating the temperature of the exhaust device at an optimal timing.

Preferably, in the temperature estimating apparatus for an internal combustion engine, the device temperature calculating means calculates an upstream temperature at a location of the exhaust system upstream of the exhaust device in accordance with the operating condition of the internal combustion engine and the humidity of the exhaust gases, and calculates the temperature of the exhaust device in accordance with the calculated upstream temperature.

Generally, in the internal combustion engine, the temperature of exhaust gases near an exhaust port can be correctly calculated in accordance with an operating condition of the internal combustion engine. As exhaust gases flow down, heat is lost as a result of heat exchange with the exhaust system. Taking into account these properties, the temperature estimating apparatus for an internal combustion engine of the present invention calculates the upstream temperature at a location of the exhaust system upstream of the exhaust device in accordance with the operating condition of the internal combustion engine and the humidity of exhaust gases, and calculates the temperature of the exhaust device in accordance with the upstream temperature which is calculated based on the more correct temperature of exhaust gases near the exhaust port. Thus, the temperature of the exhaust device can be calculated in consideration of a change in temperature of the exhaust system due to heat exchange with exhaust gases, at a location upstream of the exhaust device, thereby further improving the accuracy of the calculation.

Preferably, in the temperature estimating apparatus for an internal combustion engine, the exhaust device includes a hydrocarbon adsorbent for adsorbing hydrocarbons in exhaust gases.

This preferred embodiment of the temperature estimating apparatus for an internal combustion engine can accurately estimate the temperature of the hydrocarbon adsorbent and accordingly estimate with a high accuracy the adsorption and desorption of hydrocarbons to and from the hydrocarbon adsorbent in accordance with the estimated temperature.

Preferably, the temperature estimating apparatus for an internal combustion engine further includes desorption determining means for determining whether or not hydrocarbons have been completely desorbed from the hydrocarbon adsorbent in accordance with the temperature of the hydrocarbon adsorbent calculated by the device temperature calculating means.

Generally, the hydrocarbon adsorbent has a property of substantially completely desorbing hydrocarbons when it is heated to a predetermined temperature or higher. Therefore, according to this preferred embodiment of the temperature estimating apparatus for an internal combustion engine, it is possible to correctly determine whether or not hydrocarbons have been completely desorbed from the hydrocarbon adsorbent.

BRIEF DESCRIPTION OF THE DRAWINGS

FIG. 4 shows partial differential equations (1), (2) for calculating the temperature of exhaust gases and the temperature on the wall of the exhaust pipe based on the modelling illustrated in FIGS. 3A and 3B;

FIG. 5 shows dimensionless equations (3), (4) from the equations (1), (2) in FIG. 4, equations (5), (6) derived by solving the equations (3), (4) by a differential method, and approximate differential equations (7), (8) derived by solving again the equations (5), (6) for $\theta_G(t+\Delta t,x)$, $\theta_W(t+\Delta t,x)$, respectively;

FIG. 9 is a flow chart illustrating a routine for executing the processing at step 2 in FIG. 6 for setting initial values for temperature estimation;

FIG. 11 shows an exemplary table for use in a calculation of a threshold TRSTD for deterioration determination;

DETAILED DESCRIPTION OF THE PREFERRED EMBODIMENT

Figure 1:
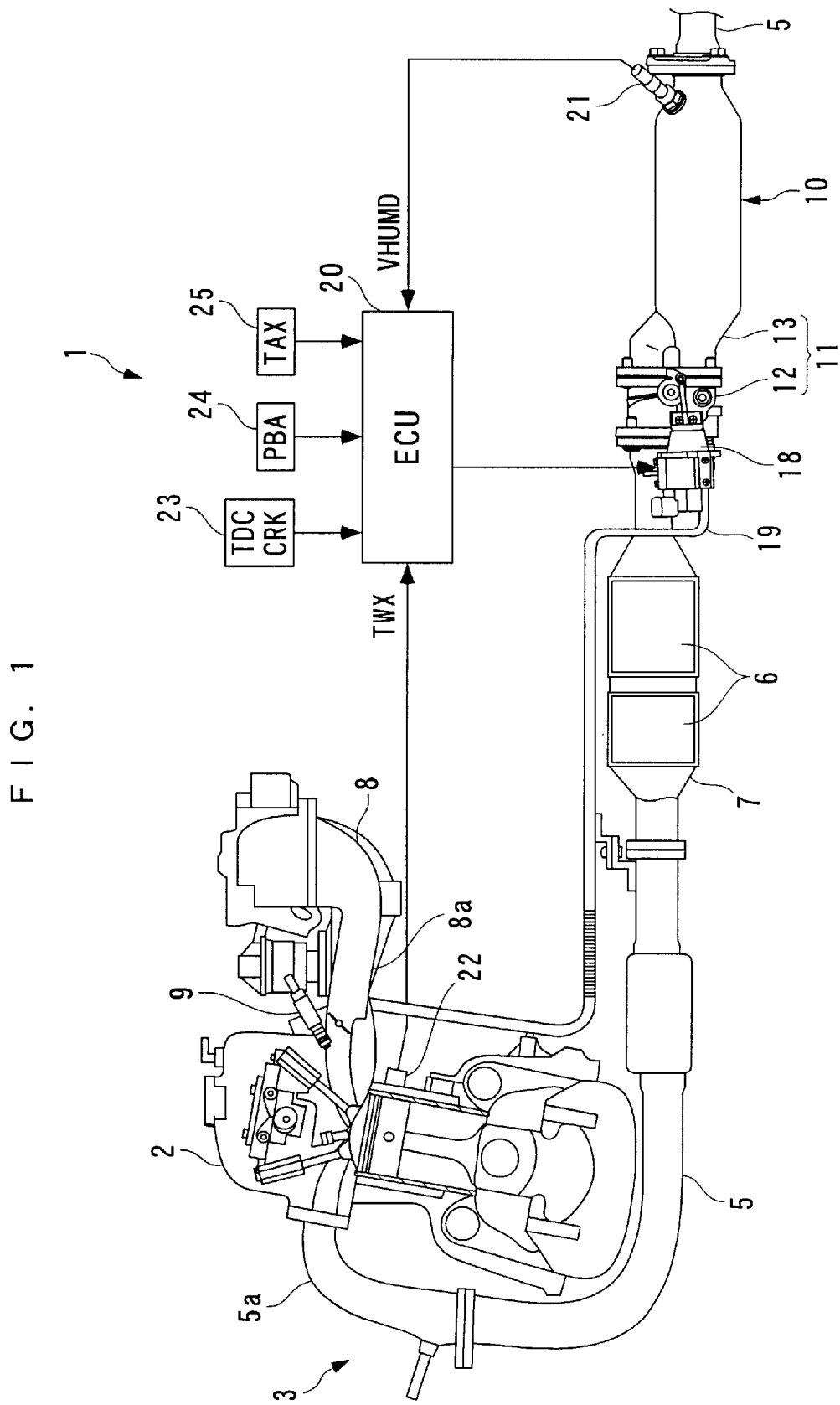
FIG. 1 is a diagram generally illustrating an internal combustion engine in which a temperature estimating apparatus for an internal combustion engine is applied according to one embodiment of the present invention.

In the following, a temperature estimating apparatus for an internal combustion engine according to one embodiment of the present invention will be described with reference to the accompanying drawings. FIG. 1 generally illustrates the configuration of the temperature estimating apparatus according to this embodiment, and an internal combustion engine in which the temperature estimating apparatus is applied. As described later, the temperature estimating apparatus 1 relies on calculations to estimate the temperature of a hydrocarbon adsorbent (hereinafter called the "adsorbent") 16 as an exhaust device arranged in an exhaust system 3 of the internal combustion engine (hereinafter called the "engine") 2.

An exhaust pipe 5 is connected to the engine 2 through an exhaust manifold 5a. A catalyzer 7 having two three-way catalysts 6, and a hydrocarbon (hereinafter called "HC") adsorber 10 for adsorbing and processing hydrocarbons are provided halfway in the exhaust pipe 5 in this order from the upstream side. The three-way catalysts 6 are arranged adjacent to each other along the exhaust pipe 5, and purify harmful substances (hydrocarbons (HC), carbon monoxide (CO) and nitrogen oxides (NOx)) in exhaust gases passing through the catalyzer 7 by oxidation-reduction catalyst actions, when they are activated. The three-way catalysts 6 begin activations at a predetermined activation starting temperature (for example, 100° C.) or higher, and are completely activated when they reach a higher complete activation temperature (for example 300° C.).

The HC adsorber 10 in turn adsorbs hydrocarbons in exhaust gases until the respective three-way catalysts 6 reach the activation starting temperature after a start of the engine to prevent hydrocarbons in exhaust gases from being emitted to the atmosphere, as will be later described.

Figure 2:
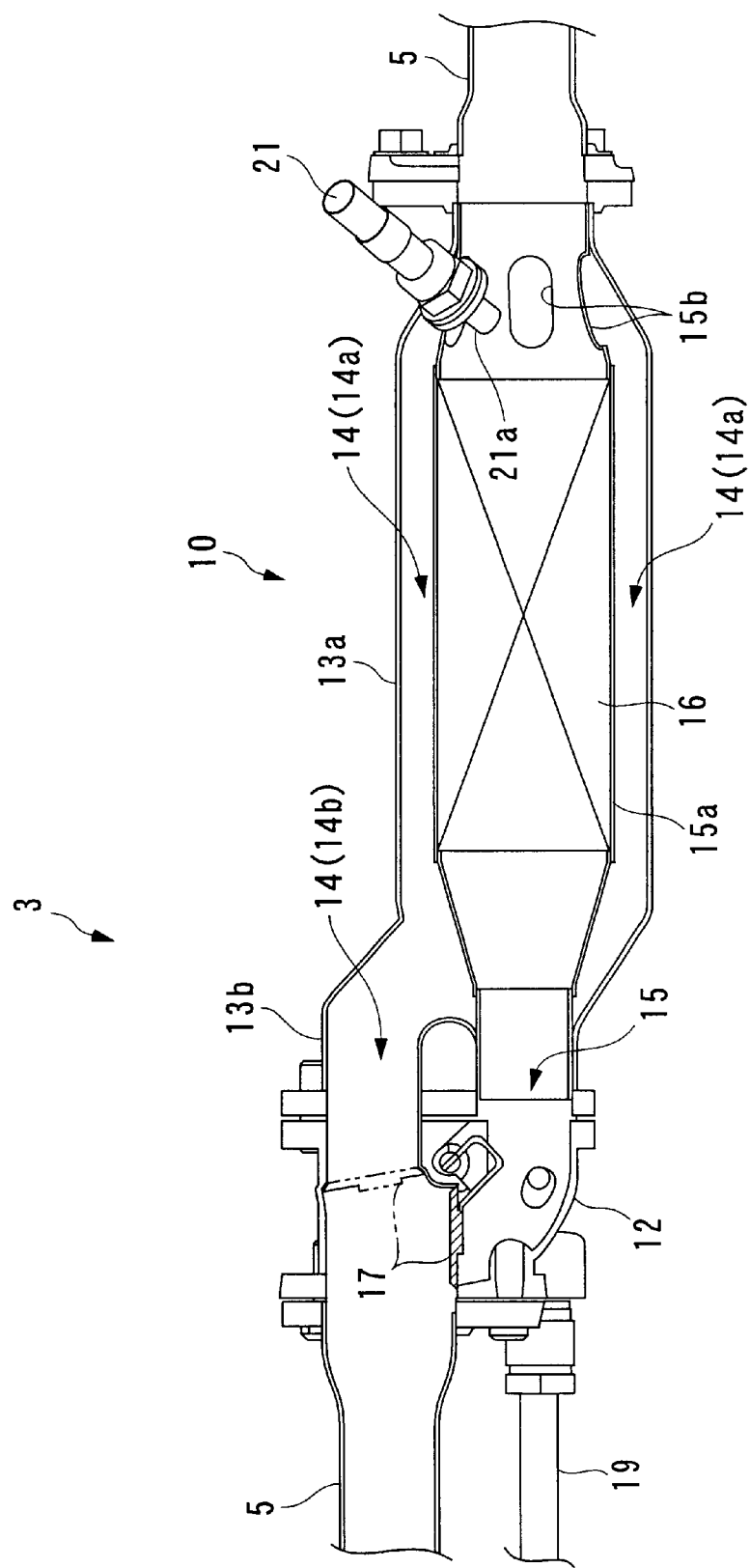
FIG. 2 is a cross-sectional view illustrating the general configuration of an exhaust system around an adsorbent.

As illustrated in FIG. 2, the HC adsorber 10 comprises an elongated case 11; a main exhaust passage 14 having an annular cross-section and formed within the case 11; a bypass exhaust passage 15 formed within the main exhaust passage 14, and once branched from the main exhaust passage 14 and again joined thereto; an adsorbent 16 arranged in the bypass exhaust passage 15; and a flow passage switching valve 17 for switching a flow passage of exhaust gases within the hydrocarbons adsorber 10 to either the main exhaust passage 14 or the bypass exhaust passage 15.

The case 11 has a branch case 12 and a downstream joint case 13 which are arranged side by side and assembled into the case 11. Both branch case 12 and joint case 13 are made of a metal (for example, stainless steel). The main exhaust passage 14 extends through the branch case 12, with an upstream end of the bypass exhaust passage 15 branching from an upstream end of the main exhaust passage 14.

The flow passage switching valve 17 is arranged at a location within the branch case 12 at which the bypass exhaust passage 15 is branched from the main exhaust passage 14 for pivotal movements about a horizontal axis. Specifically, the flow passage switching valve 17 is pivotable between a main position (indicated by solid line in FIG. 2) at which the flow passage switching valve 17 closes the bypass exhaust passage 15 and simultaneously opens the main exhaust passage 14, and a bypass position (indicated by two-dot chain lines in FIG. 2) at which the flow passage switching valve 17 closes the main exhaust passage 14 and simultaneously opens the bypass exhaust passage 15.

An electromagnetic actuator 18 and a twisted coil spring (not shown) are attached to the branch case 12 for driving the flow passage switching valve 17 to switch the exhaust gas passage. The electromagnetic actuator 18 is electrically connected to an ECU 20, later described, and is controlled ON/OFF by a driving signal from the ECU 20 to drive the flow passage switching valve 17 between the main position and bypass position in cooperation with the twisted coil spring. Specifically, the electromagnetic actuator 18 holds the flow passage switching valve 17 at the main position by an urging force of the twisted coil spring when it is turned OFF, and drives the flow passage switching valve 17 from the main position to the bypass position against the urging force of the twisted coil spring when it is turned ON.

One end of an EGR pipe 19 is connected to an intermediate location of the bypass exhaust passage 15 in the branch case 12. The other end of the EGR pipe 19 is connected to an intake pipe 8. A duty control valve, not shown, is also arranged halfway in the EGR pipe 19, such that the amount of exhaust gases (EGR amount) recirculated to the intake pipe 8 is controlled by the duty control valve under the control of the ECU 20.

The joint case 13 comprises a larger cylinder 13a formed concentrically with the bypass exhaust passage 15, and a smaller cylinder 13b connected to an upstream end of the larger cylinder 13a. The larger cylinder 13a is tapered toward the upstream end and downstream end. The bypass exhaust passage 15 has a passage wall 15a made of a metal having a high thermal conductivity (for example, stainless steel), and is similar to the larger cylinder 13a in that it is cylindrical and tapered toward the upstream end and downstream end. An upstream end and a downstream end of the passage wall 15a are connected to the inner surface of the joint case 13 in an air tight state. The passage wall 15a is formed with five oval communication holes 15a arranged at regular intervals in the circumferential direction in a lower end portion.

The bypass exhaust passage 15 in the joint case 13 is continuous to the bypass exhaust passage 15 of the branch case 12 and to the downstream exhaust pipe 5. On the other hand, the main exhaust passage 14 in the joint case 13 comprises a flow-in passage 14b extending into the smaller cylinder 13b, and an annular passage 14a which is continuous to the flow-in passage 14b, extends into the larger cylinder 13a, and closely surrounds the bypass exhaust passage 15. An upstream end of the flow-in passage 14b is continuous to the main exhaust passage 14 of the branch case 12, while a downstream end of the annular passage 14a joins to a downstream end of the bypass exhaust passage 15 through the communication holes 15b.

The adsorbent 16 is fully filled in the bypass exhaust passage 15 except for the upstream and downstream ends. The adsorbent 16 is comprised of a honeycomb core (not shown), made of a metal (for example, stainless steel), which carries zeolite on its surface, and comprises a large number of inner pores (not shown) extending therethrough along the bypass exhaust passage 15. When exhaust gases introduced into the bypass exhaust passage 15 pass through the inner pores of the adsorbent 16, hydrocarbons and moisture in the exhaust gases are adsorbed by the zeolite.

The zeolite, which has high heat resistant properties, adsorbs hydrocarbons at lower than a predetermined desorption starting temperature (for example, 100° C.), starts desorbing hydrocarbons adsorbed thereby at the desorption starting temperature or higher, and completely desorbs the adsorbed hydrocarbons at a predetermined complete desorption temperature (for example, 200° C.) or higher. The hydrocarbons desorbed from the zeolite are recirculated to the intake pipe 8 through the EGR pipe 19 and burnt in the engine 2. It should be noted that the zeolite is only required to have the ability of adsorbing hydrocarbons and is not particularly limited in type. This embodiment employs a mixture of USY (Y-type), Ga-MFI and ferrierite.

In the HC adsorber 10 configured as described above, the flow passage switching valve 17 is driven from the main position to the bypass position by the electromagnetic actuator 18 after the start of the engine 2, as will be later described. Consequently, exhaust gases passing through the catalyzer 7 are introduced into the bypass exhaust passage 15, and emitted to the outside through the exhaust pipe 5 after hydrocarbons and moisture contained therein are adsorbed by the adsorbent 16. Then, at the time the adsorbent 16 is estimated to reach an HC adsorption limit temperature, the flow passage switching valve 17 is driven from the bypass position to the main position, and an EGR operation is carried out, thereby causing hydrocarbons adsorbed on the adsorbent 16 to start desorbing through a heat exchange produced by the exhaust gases passing through the adsorbent 16. Then, hydrocarbons desorbed from the adsorbent 16 are recirculated to the intake pipe 8 through the EGR pipe 19 together with EGR gases (recirculated exhaust gases), and burnt by the engine 2. Subsequently, as the adsorbent 16 is heated to the complete desorption temperature or higher, hydrocarbons are completely desorbed from the adsorbent 16.

The intake pipe 8 is connected to one of a plurality of cylinders (only one of which is shown) of the engine 2 through one of a plurality of branches (only one of which is shown) of an intake manifold 8a. An injector 9 is attached to each branch to face an intake port of an associated cylinder. Each injector 9 is driven by a driving signal from the ECU 20 upon start of the engine 2 to inject a fuel into an intake port in an associated branch.

The temperature estimating apparatus 1 comprises a humidity sensor 21; a water temperature sensor 22; a crank angle sensor 23; an absolute intake pipe inner pressure sensor 24; an intake temperature sensor 25; the ECU 20; and the like (see FIG. 1). The humidity sensor 21 (humidity detecting means) is attached to the downstream end of the joint case 13 such that a detector 21a at a leading end thereof faces the bypass exhaust passage 15 through one of the communication holes 15b. The humidity sensor 21 detects a relative humidity VHUMD of exhaust gasses which have passed the adsorbent 16 and outputs a detection signal indicative of the relative humidity VHUMD to the ECU 20. Though detailed description is omitted here, the humidity sensor 21 is configured in a manner similar to that proposed by the Applicant in Japanese Patent Application No. 2000-23085.

The water temperature sensor 22 (operating condition detecting means) comprises a thermistor attached to the body of the engine 2, and detects an engine water temperature TWX, which is the temperature of cooling water circulating within a cylinder block of the engine 2, and outputs a detection signal indicative of the engine water temperature TXW to the ECU 20.

The crank angle sensor 23 (operating condition detecting means) is arranged on a crank shaft of the engine 2, and outputs a CRK signal and a TDC signal, both of which are pulse signals, to the ECU 20 as the crank shaft is rotated.

One pulse of the CRK signal is outputted every predetermined crank angle (for example, 30°). The ECU 20 calculates a rotational speed of the engine 2 (hereinafter called the "engine rotational speed") NE in response to the CRK signal. The TDC signal indicates that a piston of each cylinder is at a predetermined crank angle position slightly before the TDC position of an intake stroke, and one pulse is outputted every predetermined crank angle.

The absolute intake pipe inner pressure sensor 24 (operating condition detecting means) and intake temperature sensor 25 (operating condition detecting means) are arranged at locations downstream and upstream of a throttle valve in the intake pipe 8, respectively. The absolute intake pipe inner pressure sensor 24, which comprises, for example, a semiconductor pressure sensor or the like, detects an absolute intake pipe inner pressure PBA within the intake pipe 8, and outputs a detection signal indicative of the absolute intake pipe inner pressure PBA to the ECU 20. The intake temperature sensor 25, on the other hand, comprises a thermistor or the like, detects an intake temperature TAX within the intake pipe 8, and sends a detection signal indicative of the intake temperature TAX to the ECU 20.

The ECU 20 is based on a microcomputer which comprises an I/O interface, a CPU, a RAM, a ROM and the like, and determines an operating condition of the engine 2 in accordance with a control program stored in the ROM and the like in response to detection signals from a variety of the aforementioned sensors 21–25, as well as executes the calculation of the temperature of the adsorbent 16, determination as to whether hydrocarbons are desorbed from the adsorbent 16, determination on a deterioration of the adsorbent 16, and the like, in accordance with a determined operating condition, as will be later described.

Next, the principles of a technique for calculating (estimating) the temperature of the adsorbent 16 in this embodiment will be described with reference to FIGS. 3 to 5. In the following description, assume that the exhaust manifold 5a and case 11 are included in the exhaust pipe 5, and collectively referred to as the exhaust pipe 5.

Figure 3A:
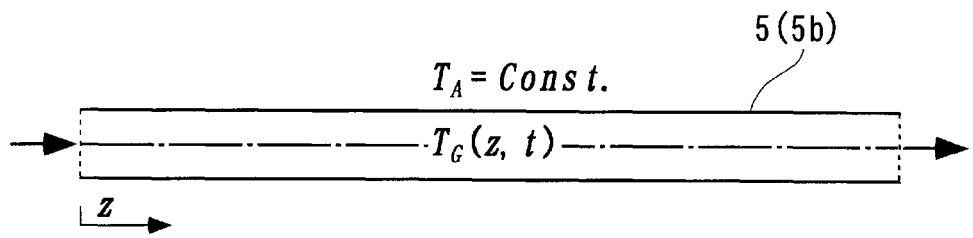
FIG. 3A is a schematic diagram which thermodynamically models an exhaust pipe.
Figure 3B:
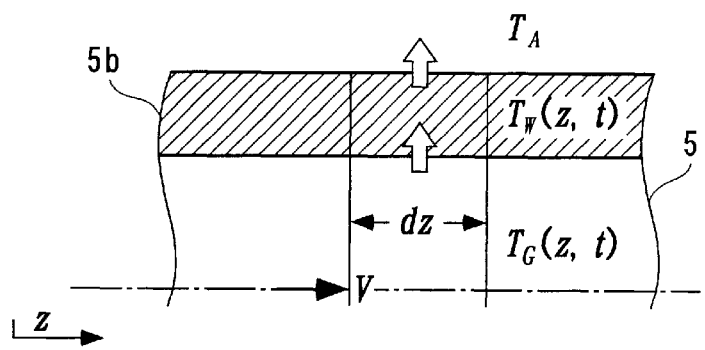
FIG. 3B is an enlarged view of a portion of the exhaust pipe.

In the calculation technique, a portion of the exhaust pipe 5 from the vicinity of an exhaust port to the vicinity of the communication holes 15b is assumed to be straight, as illustrated in FIGS. 3A and 3B, and thermodynamically modeled under the following conditions (1)–(5):

(1) An exhaust gas element moves by Vdz in a z-direction for dt time while exchanging heat with the wall 5b of the exhaust pipe 5 (hereinafter called the "exhaust pipe wall"), and the exhaust gas element changes in temperature by dt.

(2) The exhaust gas temperature and the temperature on the exhaust pipe wall 5b (hereinafter called the "exhaust pipe wall temperature") are functions of time t and location z.

(3) A thermal conductivity between exhaust gases and exhaust pipe wall 5b, and a thermal conductivity between the exhaust pipe wall 5b and external air are proportional to a difference in temperature therebetween (Newton's law of cooling).

(4) A thermal conductivity in the radial direction of the exhaust pipe wall 5b is assumed to be infinite (in other words, assume that there is no temperature distribution in the radial direction).

(5) A thermal conductivity of the exhaust pipe wall 5b in the longitudinal direction is assumed to be zero (in other words, assume that no heat is conducted between adjacent elements of exhaust pipe wall 5b).

Taking into account the foregoing conditions (1)–(5), the thermal exchanges between exhaust gases in the exhaust pipe 5 and the exhaust pipe wall 5b are represented by equation (1) shown in FIG. 4 for the exhaust gases, and by equation (2) shown in FIG. 4 for the exhaust pipe wall 5b. These equations (1), (2) are transformed into dimensionless forms as represented by equations (3), (4) shown in FIG. 5, respectively.

Next, the equations (3), (4) are solved by a differential method in consideration of differential equations corresponding to these equations (3), (4) to derive equations (5), (6), respectively, shown in FIG. 5. These equations (5), (6) are further solved again for $\theta_G(t+\Delta t,x)$, $\theta_W(t+\Delta t,x)$, respectively, to derive equations (7), (8), respectively, shown in FIG. 5. These equations (7), (8) are differential equations approximate to partial differential equations (3), (4), respectively.

It can be understood with reference to the equations (7), (8) that both dimensionless temperature converted values $\theta_G(t+\Delta t,x)$, $\theta_W(t+\Delta t,x)$ can be calculated at any position x at time $t+\Delta t$ by finding dimensionless temperature converted values $\theta_G(t,x)$, $\theta_W(t,x)$ of the exhaust gas temperature $T_G$ and exhaust pipe wall temperature $T_W$ at any position x at arbitrary time t. Accordingly, by appropriately setting initial values (for example, predetermined values for a start of the engine) for both dimensionless temperature converted values $\theta_G(t,x)$, $\theta_W(t,x)$, the dimensionless temperature converted values $\theta_G(t,x)$, $\theta_W(t,x)$ of the exhaust gas temperature $T_G$ and exhaust pipe wall temperature $T_W$ can be respectively calculated subsequently at any position x.

Further, though detailed description is omitted, a similar technique can be applied for calculating an inside adsorbent gas temperature, which is the temperature of exhaust gases within the adsorbent 16, and an adsorbent temperature which is the temperature of the adsorbent 16. In this event, the dimensionless temperature converted values of the inside adsorbent gas temperature and adsorbent temperature can be calculated respectively at any position from the end of the adsorbent 16 close to the communication holes 15b to the end of the adsorbent 16 close to the EGR pipe 19 by setting as initial values the dimensionless temperature converted values $\theta_G(t,x)$, $\theta_W(t,x)$ of the exhaust gas temperature $T_G$ and exhaust pipe wall temperature $T_W$ near the communication holes 15b.

The following description will be centered on a variety of controls executed by the ECU 20. A start mode process will be first described with reference to FIG. 6. The start mode process is executed only once immediately after an ignition switch (not shown) is turned ON. It is first determined at step 1 (labeled as "S1" in the figure. The same applies to the following description), whether or not conditions are established for the adsorbent 16 to adsorb hydrocarbons in exhaust gases, i.e., conditions for switching the flow passage switching valve 17 to the bypass position. Details of this operation will be described later.

Next, the flow proceeds to step 2, where the ECU 20 sets a variety of initial values for use in estimating (calculating) the temperature of the exhaust system 3. Details of this operation will be described later as well.

Next, the flow proceeds to step 3, where it is determined whether or not conditions are established for determining a deterioration of the adsorbent 16. Details of this operation will be described later as well.

Next, the flow proceeds to step 4, where the ECU 20 initializes a variety of flags, followed by termination of the process. Specifically, the ECU 20 sets a condensation occurrence flag F_CONDNS and a temperature estimation starting flag F_CALTTRS, later described, to "0," respectively.

Figure 7:
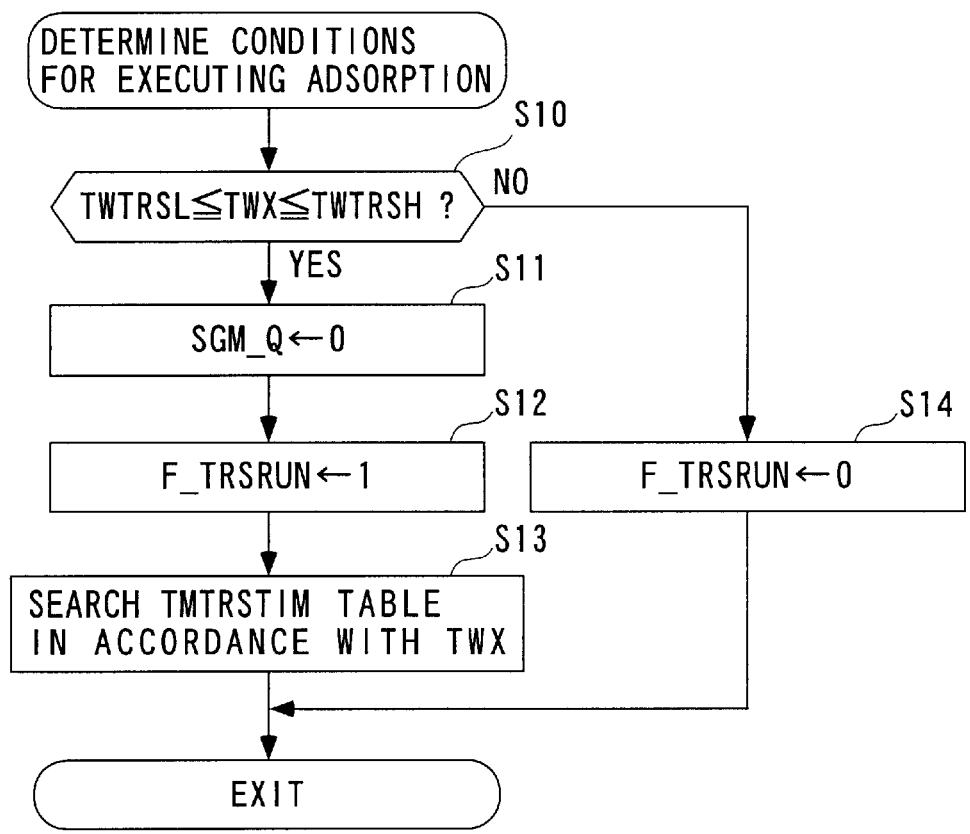
FIG. 7 is a flow chart illustrating a specific routine for determining an adsorption execution condition at step 1 in FIG. 6.

Next, the processing for determining the conditions for the adsorbent 16 to adsorb hydrocarbons at step 1 will be described with reference to FIG. 7 which illustrates a routine for executing the processing. First, at step 10, it is determined whether or not the engine water temperature TWX is equal to or higher than a predetermined lower limit value TWTRSL (for example, −20° C.) and equal to or lower than a predetermined upper limit value TWTRSH (for example, 50° C.).

If the result of determination at step 10 is YES, i.e., when TWTRS≦TWX≦TWTRSH, the routine proceeds to step 11, where the ECU 20 sets an accumulated calory value SGM_Q, later described, to zero.

Next, the routine proceeds to step 12, where the ECU 20 sets an adsorption execution flag F_TRSRUN to "1" for indicating that the conditions are established for the adsorbent 16 to adsorb hydrocarbons.

Figure 8:
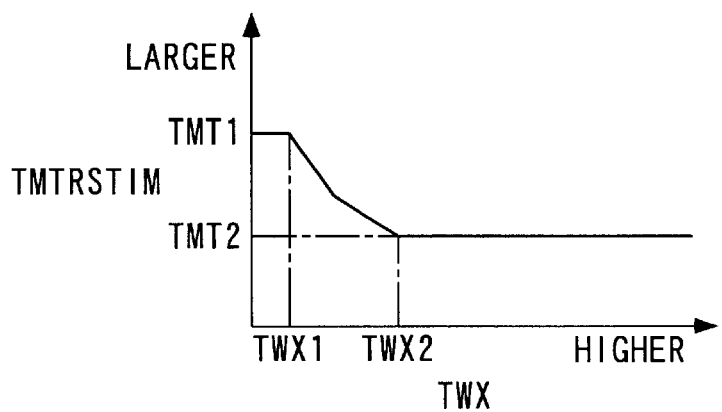
FIG. 8 shows an exemplary table for use in a calculation of a threshold TMTRSTIM for determining switching of a flow passage.

Next, the routine proceeds to step 13, where the ECU 20 searches a table shown in FIG. 8 in accordance with the engine water temperature TWX to calculate a threshold TMTRSTIM for flow passage switching determination, followed by termination of the routine. The threshold TMTRSTIM for flow passage switching determination is used in a flow passage switching control (at step 71 in FIG. 15), later described, and more specifically, used for determining a duration in which the adsorbent 16 adsorbs hydrocarbons until the adsorbent 16 reaches the HC adsorption limit temperature, with the flow passage switching valve 17 held at the bypass position.

As shown in FIG. 8, in the table, the threshold TMTRSTIM for flow passage switching determination is set at a first predetermined value TMT1 when the engine water temperature TWX is at a first lattice point TWX1 or lower, at a second predetermined value TMT2 smaller than the first predetermined value TMT1 when the engine water temperature TWX is at a second lattice point TWX2, higher than the first lattice point TWX1, or higher, and at a larger value as the engine water temperature TWX is lower between the first and second predetermined values TMT1, TMT2. This is because the temperature of the adsorbent 16 is lower as the engine water temperature TWX is lower so that it takes a longer time for the adsorbent 16 to reach the hydrocarbons adsorption limit temperature.

On the other hand, if the result of determination at step 10 is NO, the routine proceeds to step 14 on the assumption that the conditions are not established for the adsorbent 16 to adsorb hydrocarbons, and the ECU 20 sets the adsorption execution flag F_TRSRUN to "0" for indicating this fact, followed by termination of the routine.

Figure 6:
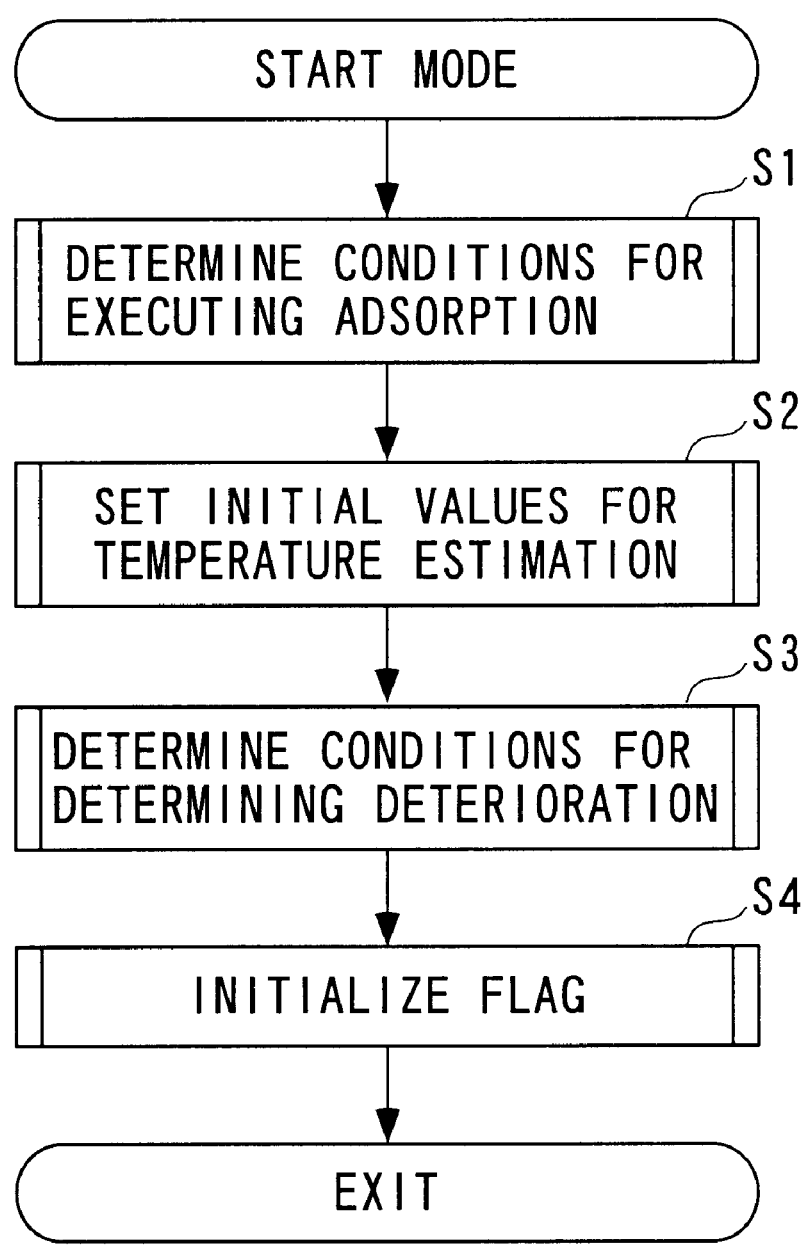
FIG. 6 is a flow chart illustrating a start mode process.

Next, the processing for setting initial values for temperature estimation at step 2 in FIG. 6 will be described with reference to FIG. 9 which illustrates a routine for executing the processing. First, at step 20, the ECU 20 calculates absolute temperature converted values TW_K, TA_K which are absolute temperatures converted from the engine water temperature TWX and intake temperature TAX, respectively.

Next, at steps 21, 22, the ECU 20 sets both an inner exhaust pipe gas temperature TEXPG[j] and an exhaust pipe wall temperature TEXPW[j] to the absolute temperature converted value TW_K of the engine water temperature TWX. The inner exhaust pipe gas temperature TEXPG[j] and exhaust pipe wall temperature TEXPW[j] will be described later in greater detail.

Next, at steps 23, 24, the ECU 20 sets both an inner adsorbent gas temperature TTRSG[j] and an adsorbent temperature TTRSW[j] to a predetermined value TTRINI (for example, 338.15°K), followed by termination of the routine. The predetermined value TTRINI is previously set based on the temperature within the exhaust pipe 5 when condensation is eliminated. The inner adsorbent gas temperature TTRSG[j] and adsorbent temperature TTRSW[j] will be described later in greater detail.

Figure 10:
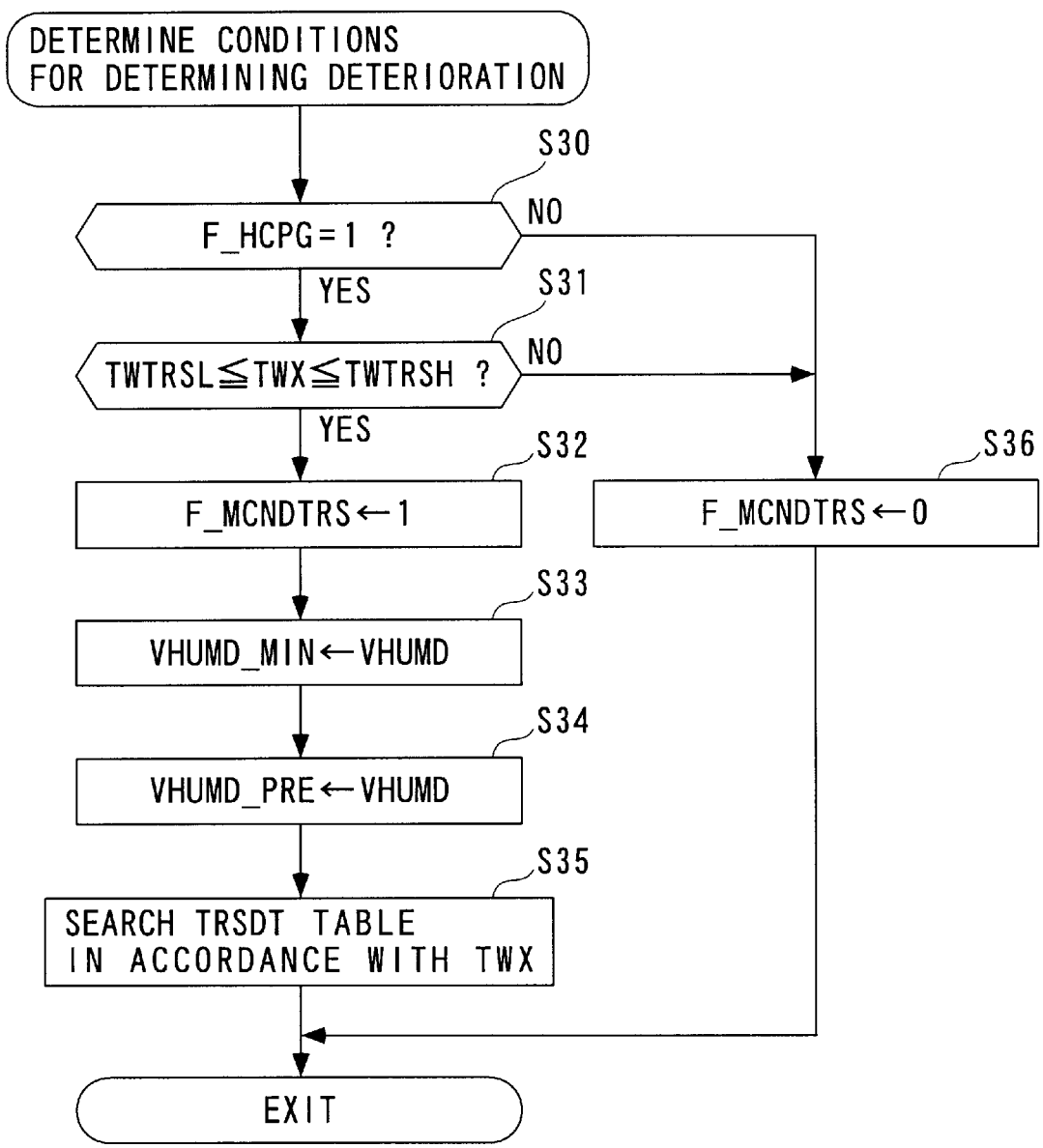
FIG. 10 is a flow chart illustrating a routine for executing the processing at step 3 in FIG. 6 for determining a deterioration determination execution condition.

Next, the processing for determining a deterioration determination execution condition at step 3 in FIG. 6 will be described with reference to FIG. 10 which illustrates a routine for executing the processing. It is first determined at step 30 whether or not an HC desorption completion flag F_HCPG is "1." The HC desorption completion flag F_HCPG is set to "1" when hydrocarbons are completely desorbed from the adsorbent 16, and otherwise to "1," as will be later described, during determination on the completion of HC desorption (see FIG. 16), executed after the start of the engine 2. The value of the HC desorption completion flag F_HCPG is stored in a RAM having a power supply for backup, and is therefore held in the RAM even after the ignition switch is turned OFF.

If the result of determination at step 30 is YES, i.e., when hydrocarbons have been completely desorbed from the adsorbent 16 after the previous start of the engine 2, the routine proceeds to step 31, where it is determined whether or not TWTRSL≦TWX≦TWTRSH is established, similarly to the aforementioned step 10.

If the result of determination at step 31 is YES, the routine proceeds to step 32 on the assumption that the conditions are established for determining a deterioration of the adsorbent 16, and the ECU 20 sets a deterioration determination execution flag F_MCNDTRS to "1" for indicating this fact.

Next, at steps 33, 34, the ECU 20 sets the output of the humidity sensor 21, i.e., detected relative humidity of exhaust gases (hereinafter called the "detected humidity") VHUMD as a minimum value VHUMD_MIN and the previous value VHUMD_PRE of the detected humidity.

Next, the routine proceeds to step 35, where the ECU 20 searches a table shown in FIG. 11 in accordance with the engine water temperature TWX to calculate a threshold TRSTD for deterioration determination, followed by termination of the routine. The threshold TRSTD for deterioration determination is used to determine whether or not the adsorbent 16 is deteriorated in deterioration determination for the adsorbent 16 (see FIG. 18), later described. As shown in FIG. 11, in the table, the threshold TRSTD for deterioration determination is set at a larger value as the engine water temperature TWX is lower. This is because the adsorbent 16 is at a lower temperature as the engine water temperature TWX is lower at the start of the engine 2, so that the adsorbent 16 has a higher HC adsorption performance, and the adsorbent 16 rises up to the HC adsorbent limit temperature with difficulties.

On the other hand, if the result of determination at step 30 is NO, i.e., when hydrocarbons have not been completely desorbed from the adsorbent 16 after the previous start of the engine 2, or if the result of determination at step 31 is NO, i.e., when the engine water temperature TWX is excessively high or excessively low, the routine proceeds to step 36 on the assumption that the conditions are not established for determining a deterioration of the adsorbent 16, and the ECU 20 sets the deterioration determination execution flag F_MCNDTRS to "0," followed by termination of the routine.

Figure 12:
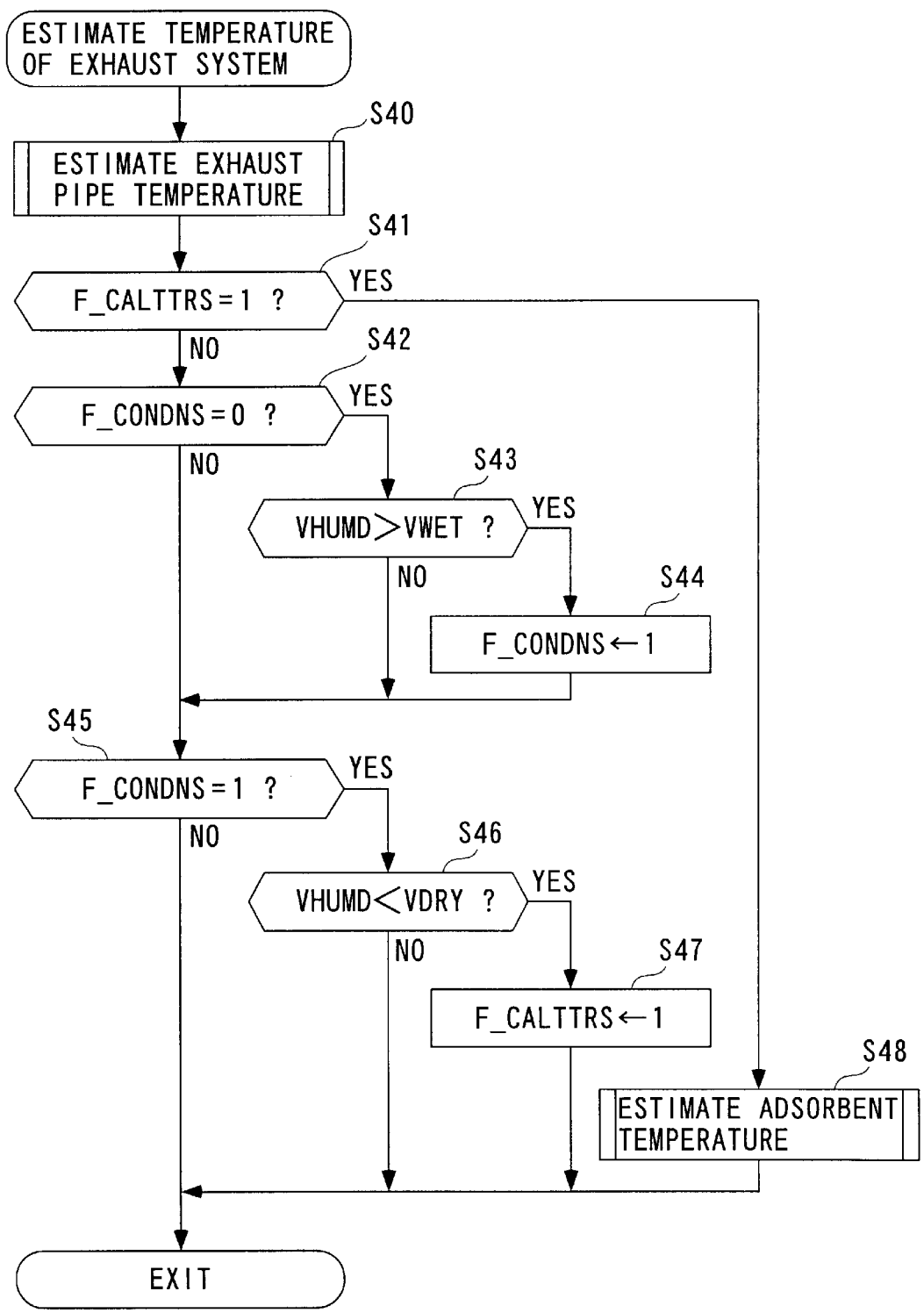
FIG. 12 is a flow chart illustrating a main routine for estimating the temperature of an exhaust system.

Next, a main routine of exhaust system temperature estimation for estimating the temperature of the exhaust system 3 will be described with reference to FIG. 12. This routine is executed at predetermined periods (for example, every 50 msec).

First, at step 40, the ECU 20 estimates the temperature of the exhaust pipe 5. Details of this operation will be described later.

Next, the routine proceeds to step 41, where it is determined whether or not a temperature estimation starting flag F_CALTTRS is "1." If the result of determination at step 41 is NO, the routine proceeds to step 42 on the assumption that no conditions are established for estimating the temperature of the adsorbent 16, and it is determined whether or not the condensation occurrence flag F_CONDNS is "0."

If the result of determination at step 42 is YES, i.e., when no condensation occurs after the start of the engine 2, the routine proceeds to step 43, where it is determined whether or not the detected humidity VHUMD is higher than a threshold VWET (for example, 95%) for determining the occurrence of condensation. If the result of determination at step 43 is NO, the routine proceeds to step 45, later described. On the other hand, if the result of determination is YES, the routine proceeds to step 44 on the assumption that condensation occurs, and the ECU 20 sets the condensation occurrence flag F_CONDNS to "1" for indicating this fact, followed by the routine proceeding to step 45. Thus, the result of determination at step 42 is NO in subsequent loops, in which case the routine proceeds to step 45.

At step 45 subsequent to steps 42–44, it is determined whether or not the condensation occurrence flag F_CONDNS is "1." If the result of determination at step 45 is NO, i.e., when condensation has never occurred even once after the start of the engine 2, the routine is terminated without further processing.

On the other hand, if the result of determination at step 45 is YES, i.e., when condensation occurs after the start of the engine 2, the routine proceeds to step 46, where it is determined whether or not the detected humidity VHUMD is lower than a threshold VDRY (for example, 20%) for condensation elimination determination. If the result of determination at step 46 is NO, the routine is terminated without further processing. On the other hand, if the result of determination at step 46 is YES, i.e., when the condensation is eliminated, the routine proceeds to step 47 on the assumption that conditions are established for estimating the temperature of the adsorbent 16, and the ECU 20 sets the temperature estimation starting flag F_CALTTRS to "1" for indicating this fact, followed by termination of the routine. Thus, the result of determination at step 41 is YES in subsequent loops, in which case the routine proceeds to step 48, where the ECU 20 estimates the temperature of the adsorbent 16, as later described, followed by termination of the routine.

Next, the processing for estimating the temperature of the exhaust pipe 5 at step 40 in FIG. 12 will be described with reference to FIG. 13 which illustrates a routine for executing the processing. As described below, this routine calculates the inner exhaust pipe gas temperatures TEXPG[j] and exhaust pipe wall temperatures TEXPW[j] (upstream temperatures), respectively. These inner exhaust pipe gas temperatures TEXPG[j] and exhaust pipe wall temperatures TEXPW[j] indicate values at seven locations on the exhaust pipe 5 from the vicinity of the exhaust port to the vicinity of the communication holes 15b, where a larger value of j indicates a location more downstream of the exhaust pipe 5. Specifically, TEXPG[7] and TEXPW[7] indicate values near the communication holes 15b, respectively. It should be noted that the locations at which the inner exhaust pipe gas temperature TEXPG[j] and exhaust pipe wall temperature TEXPW[j] are calculated are not limited to seven, but may be increased or decreased as appropriate.

Figure 13:
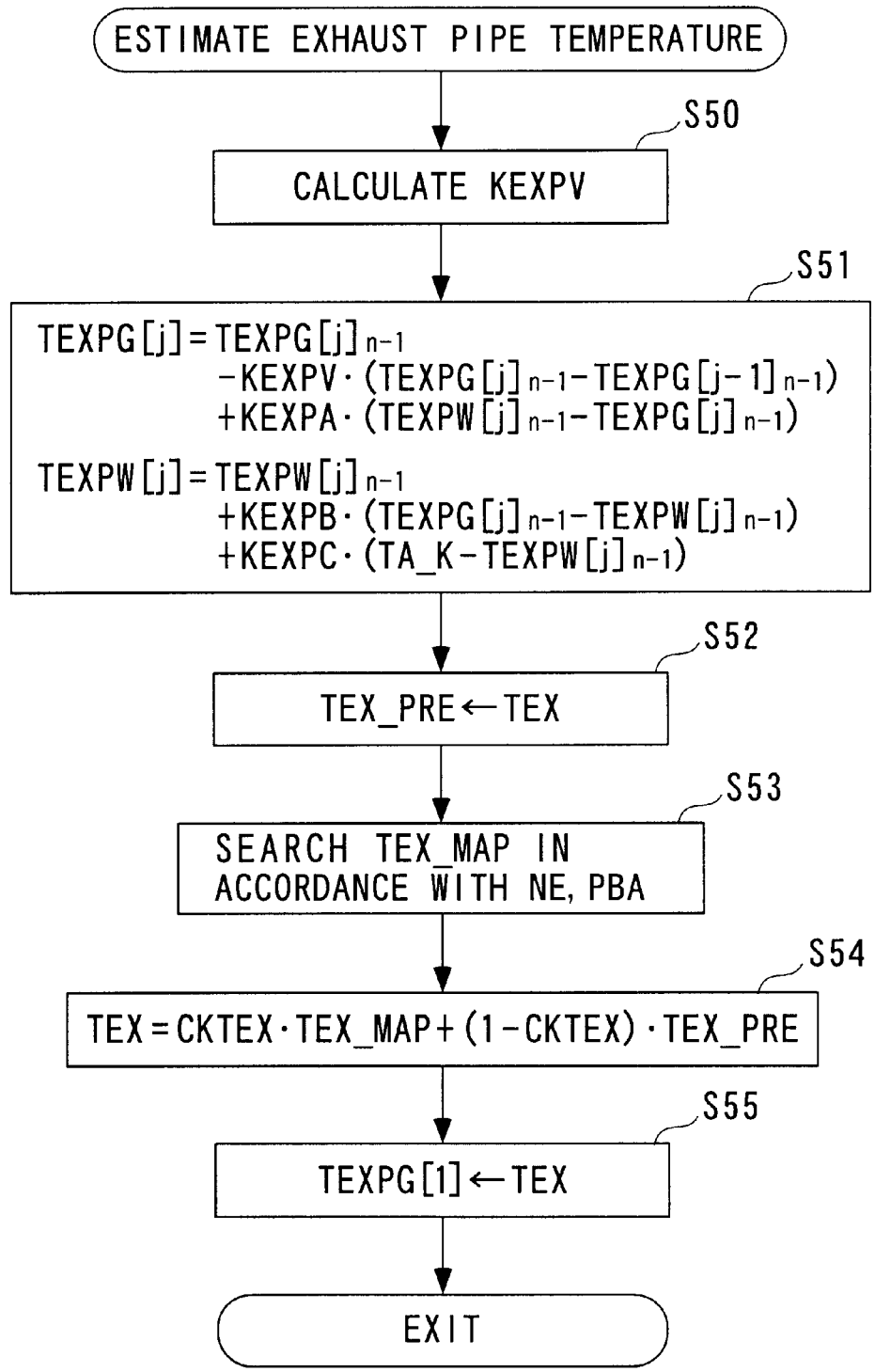
FIG. 13 is a flow chart illustrating a routine for executing the processing at step 40 in FIG. 12 for estimating the temperature of an exhaust pipe.

In the routine illustrated in FIG. 13, the ECU 20 first calculate an exhaust flow velocity KEXPV at step 50. The exhaust flow velocity KEXPV corresponds to a coefficient $(v \cdot \Delta t / \Delta x)$ in the second term of the right side of the equation (7) in FIG. 5. Specifically, the exhaust flow velocity KEXPV is calculated in accordance with the engine rotational speed NE and absolute intake pipe inner pressure PBA by searching a map, not shown. In this map, the exhaust flow velocity KEXPV is set at a larger value as the engine rotational speed NE is higher or the absolute intake pipe inner pressure PBA is higher. Alternatively, instead of searching the map as mentioned above, the exhaust flow velocity KEXPV may be calculated by a predetermined equation in accordance with the engine rotational speed NE and absolute intake pipe inner pressure PBA.

Next, the routine proceeds to step 51, where the ECU 20 calculates a current value TEXPG[j] of the inner exhaust pipe gas temperature and a current value TEXPW[j] of the exhaust pipe wall temperature in accordance with the following equations (9), (10), using the absolute temperature converted value TA_K of the intake temperature and the exhaust flow velocity KEXPV calculated at steps 20, 50, respectively. The equations (9), (10) corresponds to the aforementioned equations (7), (8) in FIG. 5, respectively:

$$TEXPG[j]=TEXPG[j]_{n-1}-KEXPV \cdot (TEXPG[j]_{n-1}-TEXPG[j-1]_{n-1})+ KEXPA \cdot (TEXPW[j]_{n-1}-TEXPG[j]_{n-1}) \quad (9)$$

$$TEXPW[j]=TEXPW[j]_{n-1}+KEXPB \cdot (TEXPG[j]_{n-1}-TEXPW[j]_{n-1})+ KEXPC \cdot (TA\_K-TEXPW[j]_{n-1}) \quad (10)$$

where j is an integer from 2 to 7, $TEXPG[j]_{n-1}$ and $TEXPW[j]_{n-1}$ are the previous values of the inner exhaust pipe gas temperature and exhaust pipe wall temperature, respectively; and KEXPA, KEXPB, KEXPC are previously set constants, respectively, which corresponds to a coefficient ($a \cdot \Delta t$) in the third term on the right side of the equation (7), a coefficient ($b \cdot \Delta t$) in the second term on the right side of the equation (8), and a coefficient ($c \cdot \Delta t$) in the third term on the right side of the equation (8).

Next, the routine proceeds to step 52, where the ECU 20 sets an engine exit gas temperature (the temperature of exhaust gases near the exhaust port) TEX stored in the RAM as a previous value TEX_PRE of the engine exit gas temperature.

Next, the routine proceeds to step 53, where the ECU 20 searches a map, not shown, in accordance with the engine rotational speed NE and absolute intake air inner pressure PBA to calculate a map value TEX_MAP of the engine exit gas temperature.

Next, the routine proceeds to step 54, where the ECU 20 calculates a current value TEX of the engine exit temperature in accordance with the following equation (11) using TEX_PRE and TEX_MAP calculated at steps 52, 53, respectively:

$$TEX=CKTEX \cdot TEX\_MAP+(1-CKTEX) \cdot TEX\_PRE \quad (11)$$

where CKTEX is a weighting coefficient which is set at a predetermined value larger than zero and smaller than one.

Next, the routine proceeds to step 55, where the ECU 20 sets the current value TEX of the engine exit temperature calculated at step 54 as an inner exhaust pipe gas temperature TEXPG[1] (temperature of exhaust gases near the exhaust port of the exhaust pipe 5), followed by termination of the routine.

Next, the processing for estimating the temperature of the adsorbent 16 at step at 48 in FIG. 12 will be described with reference to FIG. 14 which illustrates a routine for executing the processing. As described below, this routine calculates the inner adsorbent gas temperature TTRSG[j] and adsorbent temperature TTRSW[j], respectively, in a similar technique as that used for calculating the aforementioned inner exhaust pipe gas temperature TEXPG[j] and intake pipe wall temperature TEXPW[j]. These inner adsorbent gas temperatures TTRSG[j] and adsorbent temperatures TTRSW[j] indicate values at seven locations, respectively, on the exhaust pipe 5 from the end of the adsorbent 16 close to the communication holes 15b to the end of the adsorbent 16 close to the EGR pipe 19, where a larger value of j indicates a location more downstream of the adsorbent, i.e., closer to the EGR pipe 19. Specifically, TTRSG[7] and TTRSW[7] indicate values at the end of the adsorbent 16 close to the EGR pipe 19, respectively. It should be noted that the locations at which the inner adsorbent gas temperatures TTRSG[j] and adsorbent temperatures TTRSW[j] are calculated are not limited to seven, but may be increased or decreased as appropriate.

Figure 14:
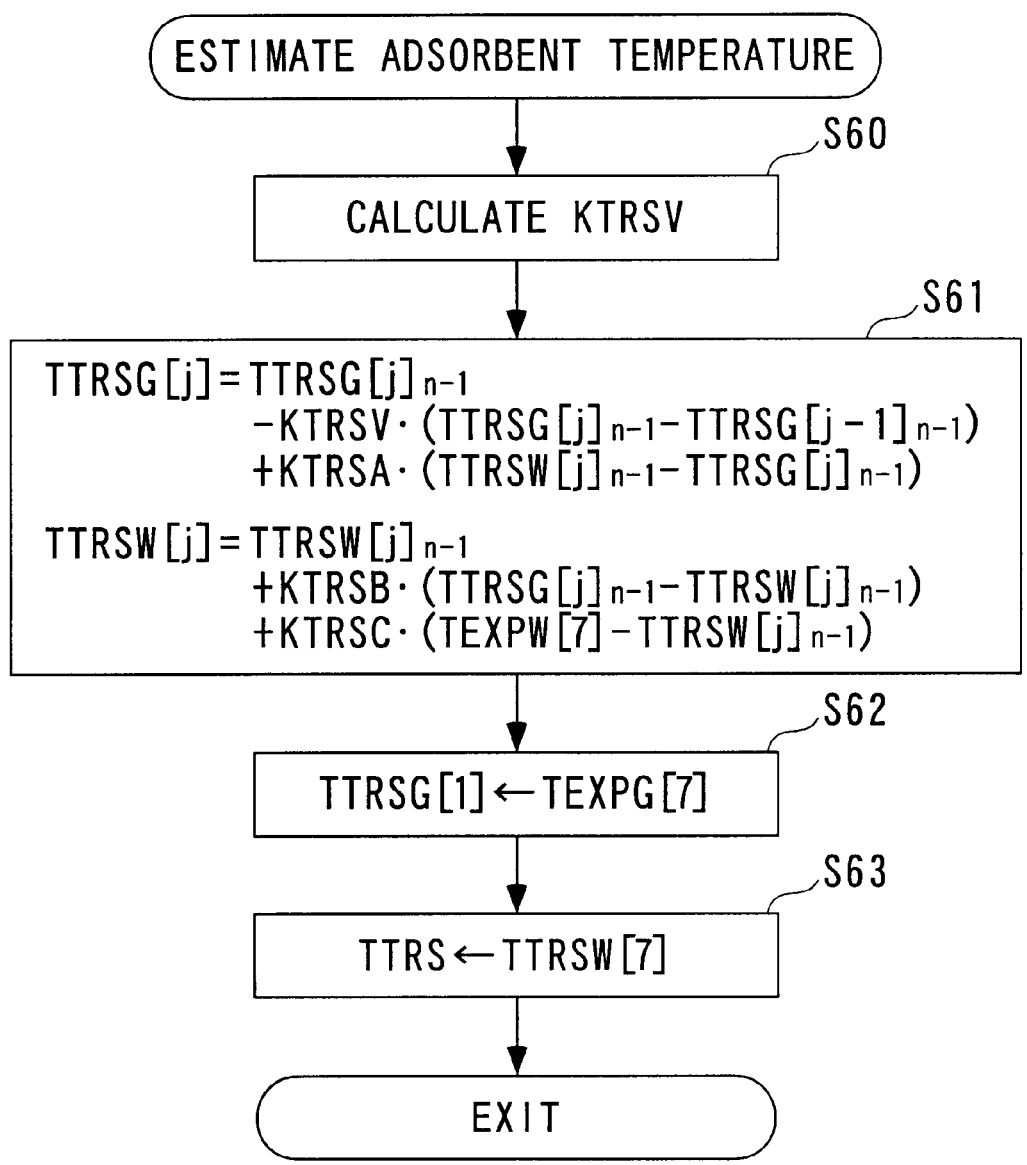
FIG. 14 is a flow chart illustrating a routine for executing the processing at step at 48 in FIG. 12 for estimating the temperature of the adsorbent.

In the routine illustrated in FIG. 14, the ECU 20 first calculates an exhaust flow velocity KTRSV within the adsorbent 16. The exhaust flow velocity KTRSV is the flow velocity of EGR gases flowing through the adsorbent 16 which is calculated by searching a map (not shown) or in accordance with an equation (not shown) in accordance with a parameter indicative of an exhaust gas flow rate (for example, the engine rotational speed NE, absolute intake air inner pressure PBA, or the like), the fuel injection amount, an EGR recirculation rate, and the like.

Next, the routine proceeds to step 61, where the ECU 20 calculates a current value TTRSG[j] of the inner adsorbent gas temperature and a current value TTRSW[j] of the adsorbent temperature in accordance with the following equations (12), (13), substantially similar to the aforementioned equations (9), (10), using the exhaust gas temperature TEXPW[7] and exhaust flow velocity KTRSV calculated at steps 51, 60, respectively:

$$TTRSG[j]=TTRSG[j]_{n-1}-KTRSV \cdot (TTRSG[j]_{n-1}-TTRSG[j-1]_{n-1})+ KTRSA \cdot (TTRSW[j]_{n-1}-TTRSG[j]_{n-1}) \quad (12)$$

$$TTRSW[j]=TTRSW[j]_{n-1}+KTRSB \cdot (TTRSG[j]_{n-1}-TTRSW[j]_{n-1})+ KTRSC \cdot (TEXPW[7]-TTRSW[j]_{n-1}) \quad (13)$$

where j is an integer from 2 to 7, $TTRSG[j]_{n-1}$ and $TTRSW[j]_{n-1}$ are the previous values of the inner adsorbent gas temperature and adsorbent temperature, respectively; and KTRSA, KTRSB, KTRSC are previously set constants, respectively.

Next, the routine proceeds to step 62, where the ECU 20 sets TEXPG[7] (the exhaust gas temperature near the communication holes 15b) calculated at step 51 is set as TTRSG[1] (the inner adsorbent gas temperature at the end of the adsorbent 16 close to the communication holes 15b).

Next, the routine proceeds to step 63, where the ECU 20 sets TTRSW[7] (adsorbent temperature at the end of the adsorbent 16 close to the EGR pipe 19) calculated at step 51 as a final estimated adsorbent temperature TTRS (temperature of the exhaust device), followed by termination of the routine.

Figure 15:
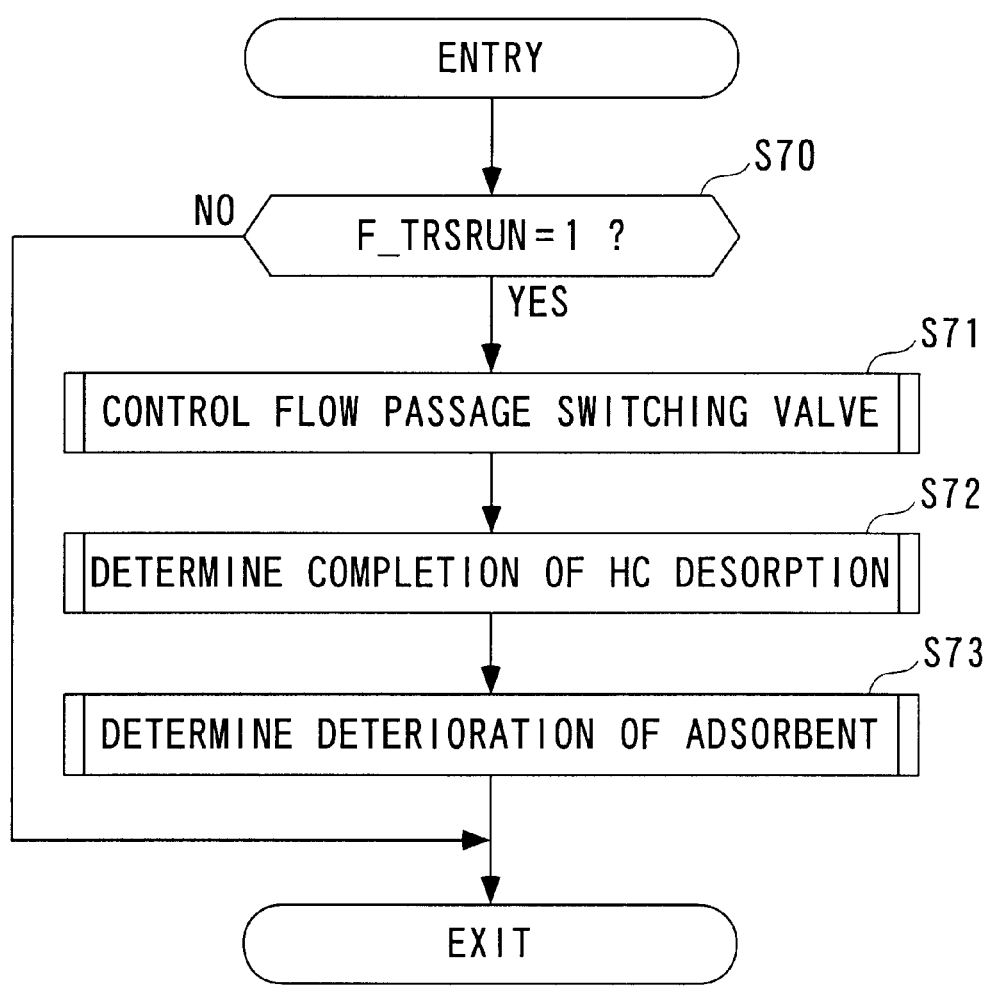
FIG. 15 is a flow chart illustrating a main routine for controlling an HC adsorber.

Next, a main routine for controlling the HC adsorber 10 will be described with reference to FIG. 15. This routine is executed at predetermined periods (for example, every 100 msec).

It is first determined at step 70 whether or not the adsorption execution flag F_TRSRUN is "1." If the result of determination at step 70 is NO, the routine is terminated. On the other hand, if the result of determination at step 70 is YES, i.e., when conditions are established for the adsorbent 16 to adsorb hydrocarbons, the routine proceeds to step 71, where the ECU controls the flow passage switching valve 17.

Though the control of the flow passage switching valve 17 is not illustrated, the ECU 20 switches the flow passage switching valve 17 based on the accumulated calory value SGM_Q in the following manner. The accumulated calory value SGM_Q indicates an accumulated value (total sum) of calory supplied to the exhaust system 3 after the start of the engine 2, and is calculated based on an accumulated amount of fuel injected from the injector 9. In this control, the flow passage switching valve 17 is switched to the bypass position until the accumulated calory amount SGM_Q reaches a threshold TMTRSTIM for flow passage switching determination, calculated at the aforementioned step 13 (i.e., until the adsorbent 16 reaches the HC adsorption limit temperature), whereby hydrocarbons in exhaust gases are adsorbed to the adsorbent 16. Then, as the accumulated calory amount SGM_Q reaches the threshold TMTRSTIM for flow passage switching determination, the ECU 20 switches the flow passage switching valve 17 to the main position, so that the adsorbent 16 subsequently does not adsorb hydrocarbons.

Next, the routine proceeds to step 72, where the ECU 20 determines the completion of desorption of hydrocarbons from the adsorbent 16. This determination on the complete desorption will be described later in greater detail.

Next, the routine proceeds to step 73, where the ECU 20 determines a deterioration of the adsorbent 16, followed by termination of the routine. The determination on a deterioration of the adsorbent 16 will be described later in greater detail.

Figure 16:
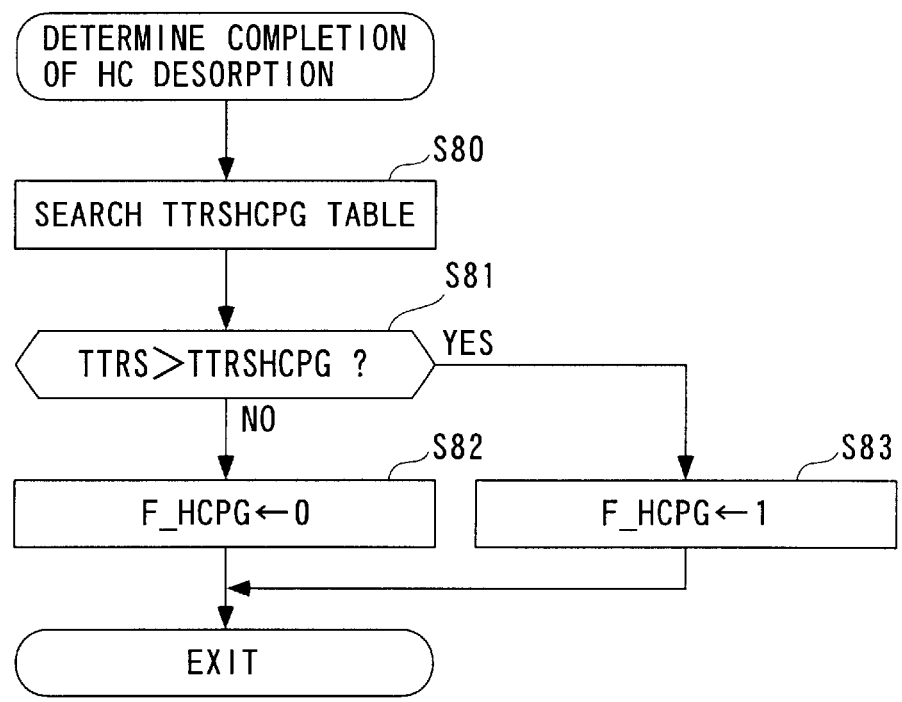
FIG. 16 is a flow chart illustrating a routine for executing the processing at step 72 in FIG. 15 for determining completion of HC desorption from the adsorbent.

Next, the processing at step 72 for determining whether or not hydrocarbons have been completely desorbed from the adsorbent 16 will be described with reference to FIG. 16.

Figure 17:
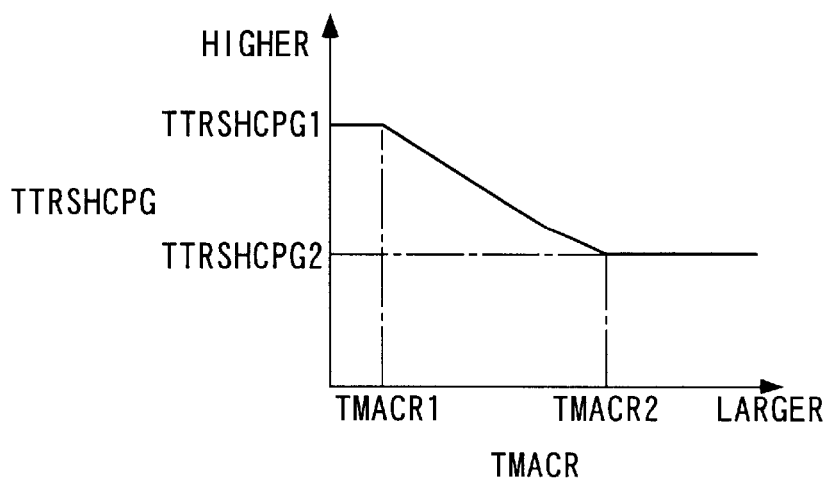
FIG. 17 shows an exemplary table for use in a calculation of a threshold TTRSHCPG for determination on completion of HC desorption.

First, at step 80, the ECU 20 calculates a threshold TTRSHCPG for desorption completion determination by searching a table shown in FIG. 17 in accordance with a timer value TMACR of a post-start timer. The post-start timer is of a up-count type for measuring a time after the start of the engine 2, i.e., after the ignition switch is turned ON.

As shown in FIG. 17, in the table, the threshold TTRSHCPG for desorption completion determination is set at a first predetermined temperature TTRSHCPG1 (for example, 220° C.) when the timer value TMARC is equal to or smaller than a first predetermined value TMACR1 (for example, 200 sec), and at a second predetermined temperature TTRSHCPG2 lower than the first predetermined temperature TTRSHCPG1 (for example, 170° C.) when the timer value is equal to or larger than a second predetermined value TMACR2 larger than the first predetermined value TTRSHCPG1 (for example, 600 sec). Also, between the first and second predetermined values, the threshold TTRSHCPG for desorption completion determination is set at a larger value as the timer value TMACR is smaller. This setting is made for the following reason. The heat conducts less in the radial direction of the adsorbent 16 in a shorter time after the start of the engine, so that complete desorption of hydrocarbons is determined without fail, using the table shown in FIG. 17 while compensating for the thermal conduction.

Next, the routine proceeds to step 81, where it is determined whether or not the estimated adsorbent temperature TTRS calculated at step 63 is higher than the threshold TTRSHCPG calculated at step 80. If the result of determination at step 80 is NO, the routine proceeds to step 82 on the assumption that hydrocarbons have not been completely desorbed from the adsorbent 16, and the ECU 20 sets the HC desorption completion flag F_HCPG to "0," followed by termination of the routine.

On the other hand, if the result of determination at step 81 is YES, the routine proceeds to step 83 on the assumption that hydrocarbons have been completely desorbed from the adsorbent 16, and the ECU 20 sets the HC desorption completion flag F_HCG to "1" for indicating this fact, followed by termination of the routine.

Figure 18:
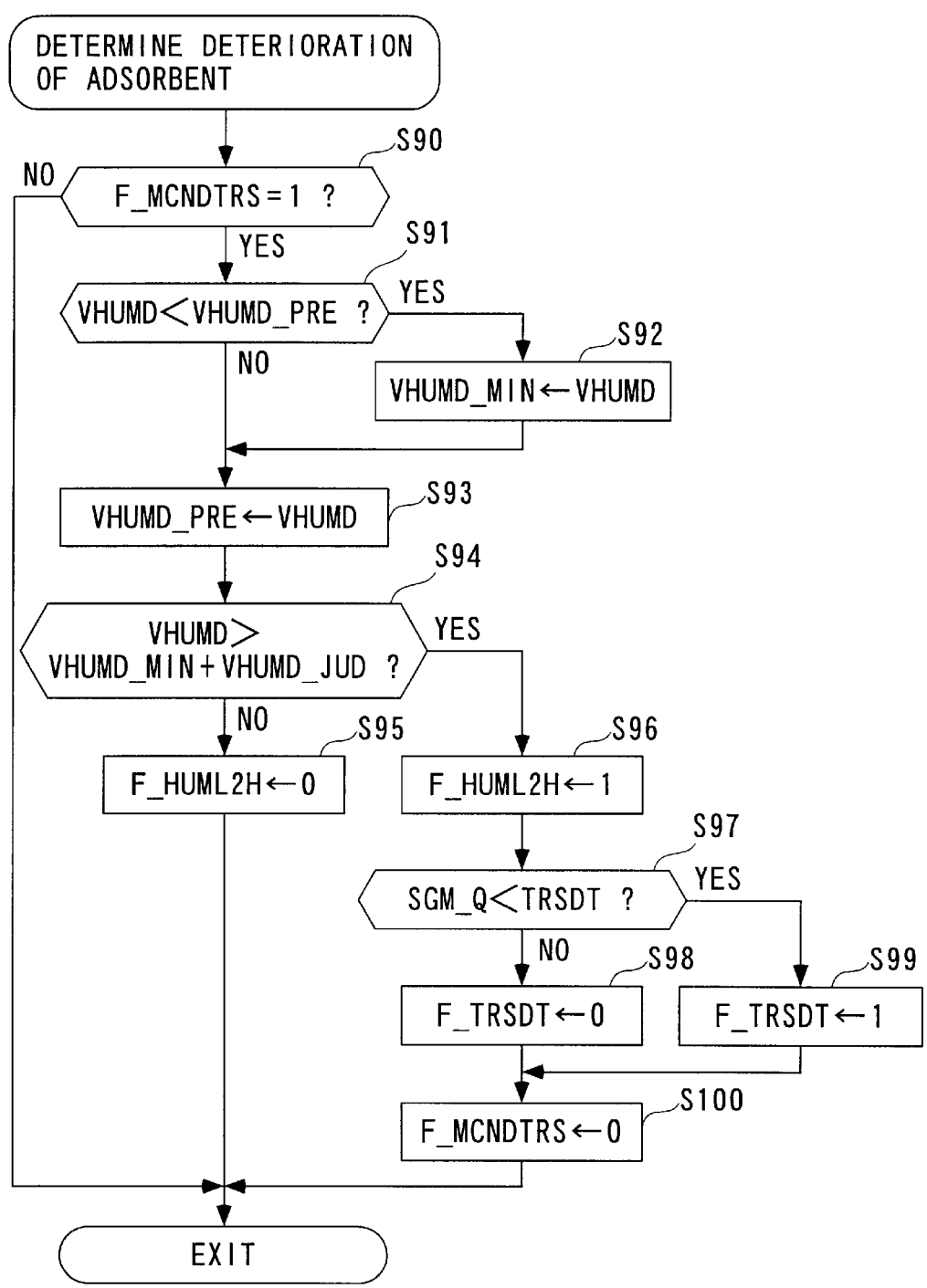
FIG. 18 is a flow chart illustrating a routine for executing the processing at step 73 in FIG. 15 for determining a deterioration of the adsorbent.

In the following, the processing at step 73 for determining whether or not the adsorbent 16 is deteriorated will be described with reference to FIG. 18 which illustrates a routine for executing the processing.

It is first determined at step 90 whether or not the deterioration determination execution flag F_MCNDTRS is "1." If the result of determination at step 90 is NO, the routine is terminated without further processing. On the other hand, if the result of determination at step 90 is YES, i.e., when conditions are established for determining a deterioration of the adsorbent 16, the routine proceeds to step 91, where it is determined whether or not a detected humidity VHUMD is lower than its previous value VHUMD_PRE.

If the result of determination at step 91 is NO, i.e., when the detected humidity VHUMD has increased, the routine proceeds to step 93, later described. On the other hand, if the result of determination at step 91 is YES, i.e., when the detected humidity VHUMD has decreased, the routine proceeds to step 92, where the ECU 20 sets the detected humidity VHUMD as its minimum value VHUMD_MIN, followed by the routine proceeding to step 93.

At step 93, the ECU 20 sets the detected humidity VHUMD as the previous value VHUMD_PRE.

Next, the routine proceeds to step 94, where it is determined whether or not the detected humidity VHUMD is higher than the sum of the minimum value VHUMD_MIN of the detected humidity and a predetermined addition term VHUMD_JUD for determination. If the result of determination at step 94 is NO, the routine proceeds to step 95 on the assumption that the detected humidity VHUMD has not risen, and the ECU 20 sets a humidity rising flag F_HUML2H to "0" for indicating this fact, followed by termination of the routine.

On the other hand, if the result of determination at step 94 is YES, the routine proceeds to step 96 on the assumption that the detected humidity VHUMD has risen, and the ECU 20 sets the humidity rising flag F_HUML2H to "1" for indicating this fact.

Next, the routine proceeds to step 97, where it is determined whether or not the accumulated calory value SGM_Q is smaller than the threshold TRSTD for deterioration determination calculated at step 35. If the result of determination at step 97 is YES, i.e., when the detected humidity VHUMD rises though the adsorbent 16 has been given small amount of calory and its temperature has not increased, the routine proceeds to step 99 on the assumption that the adsorbent 16 is deteriorated, and the ECU 20 sets a deterioration establishment flag F_TRSDT to "1" for indicating this fact.

Next, the routine proceeds to step 100, where the ECU 20 sets the deterioration determination execution flag F_MCNDTRS to "0," followed by termination of the routine. Thus, the result of determination at step 90 is NO in subsequent loops, in which case steps 91 to 100 are not executed.

On the other hand, if the result of determination at step 97 is NO, i.e., when the detected humidity VHUMD rises due to a large amount of calory supplied to the adsorbent 16, the temperature of which is therefore increased, the routine proceeds to step 98 on the assumption that the adsorbent 16 is not deteriorated, and the ECU 20 sets the deterioration establishment flag F_TRSDT to "0" for indicating this fact. Next, the ECU 20 executes step 100, followed by termination of the routine.

Figure 19:
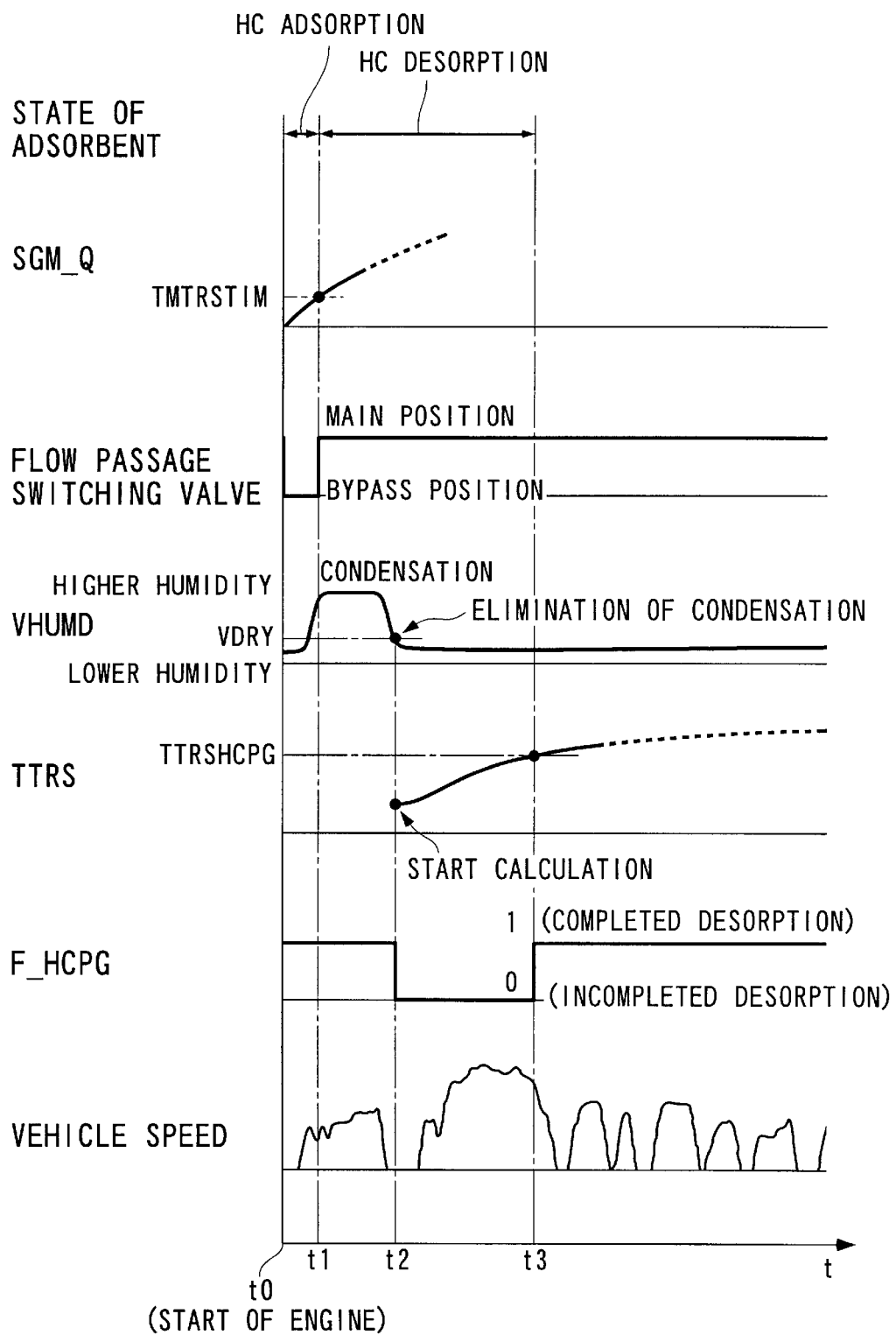
FIG. 19 is a timing chart illustrating an exemplary operation of the engine when it is started.

FIG. 19 illustrates an exemplary operation of the engine when it is started, provided by the foregoing control. As illustrated, when the engine water temperature TWX is in a range TWTRSL≦TWX≦TWTRSH at the time the engine 2 is started (time t0), the ECU 20 switches the flow passage switching valve 17 to the bypass position, causing the adsorbent 16 to adsorb hydrocarbons. Then, as the engine 2 is continuously operated, the accumulated calory value SGM_Q is increased to increase the temperature of the adsorbent 16, causing the amount of moisture adsorbed to the adsorbent 16 to exceed the adsorbing capability of the adsorbent 16. Consequently, the detected humidity VHUMD rises. If the HC desorption completion flag F_HCPG has been set to "1" upon the previous start of the engine 2 when the detected humidity VHUMD rises, the ECU 20 determines a deterioration of the adsorbent 16.

Subsequently, condensation occurs within the exhaust pipe 5, and the accumulated calory value SGM_Q exceeds the threshold TMTRSTIM for flow passage switching determination at time t1, at which the ECU 20 switches the flow passage switching valve 17 from the bypass position to the main position, and starts the EGR operation, whereby hydrocarbons begin desorbing from the adsorbent 16, and the temperature of the exhaust pipe 5 increased so that the condensation begins disappearing.

Then, at the time (time t2) the detected humidity VHUMD goes below the threshold VDRY for condensation elimination determination, i.e., at the time the condensation is eliminated, the ECU 20 starts calculating the estimated adsorbent temperature TTRS. Subsequently, at the time (t3) the estimated adsorbent temperature TTRS exceeds the threshold TTRSHCPG for HC desorption completion determination, i.e., at the time hydrocarbons have completely desorbed from the adsorbent 16, the ECU 20 sets the HC desorption completion flag F_HCPG to "1" for indicating this fact. This causes the ECU 20 to determine a deterioration of the adsorbent 16 when the detected humidity VHUMD rises at the next start of the engine 2.

As described above, the temperature estimating apparatus 1 according to the foregoing embodiment begins estimating the temperature of the adsorbent 16, upon elimination of condensation which has occurred at least once after the start of the engine 2, using the previously set predetermined value TTRSINI based on the temperature at which condensation is eliminated. Therefore, the temperature estimating apparatus 1 can correctly calculate and estimate the temperature of the adsorbent 16 while securely avoiding the influence of condensation even when the engine 2 is started under a low temperature condition. In the event of calculation, the temperature estimating apparatus 1 calculates the temperature of the exhaust pipe 5 between the adsorbent 16 and the engine 2 located upstream of the adsorbent 16, and the temperature of exhaust gases, and calculates the temperature of exhaust gases flowing through the adsorbent 16 and the temperature of the adsorbent 16, respectively, in accordance with the calculated temperatures of the exhaust pipe 5 and exhaust gases, thereby making it possible to calculate the temperature of the adsorbent 16, taking into account a change in temperature of the exhaust pipe 5 due to heat exchange with the exhaust gases, to further improve the accuracy of calculation.

Additionally, since the temperature estimating apparatus 1 can correctly calculate the temperature of the adsorbent 16 as described above, it is possible to accurately determine whether or not hydrocarbons have been completely desorbed from the adsorbent 16 in accordance with the calculated temperature of the adsorbent 16. Consequently, the humidity sensor 21 can be determined in regard to a deterioration while avoiding the influence of incomplete desorption of hydrocarbons from the adsorbent 16 on the humidity of exhaust gases, to improve the accuracy of determination.

It should be understood that an object, the temperature of which is estimated by the temperature estimating apparatus 1 of the present invention, is not limited to the adsorbent 16 in the foregoing embodiment, but may be any exhaust device for purifying exhaust gases in the exhaust system, for example, a three-way catalyst.

As described above, the temperature estimating apparatus for an internal combustion engine according to the present invention can correctly calculate and estimate the temperature of an exhaust device even when the internal combustion engine is started under a low temperature condition.

What is claimed is:

1. A temperature estimating apparatus for an internal combustion engine arranged in an exhaust system of the internal combustion engine for estimating a temperature of an exhaust device for purifying exhaust gases through calculations, said apparatus comprising:

operating condition detecting means for detecting an operating condition of said internal combustion engine, including a state of intake air;

humidity detecting means for detecting a humidity of exhaust gases; and device temperature calculating means for calculating the temperature of said exhaust device in accordance with the detected operating condition of said internal combustion engine and the detected humidity of the exhaust gases.

2. A temperature estimating apparatus for an internal combustion engine according to claim 1, further comprising:

condensation determining means for determining whether or not condensation occurs within said exhaust system in accordance with the detected humidity of the exhaust gases, wherein said device temperature calculating means calculates the temperature of said exhaust device further in accordance with a result of determination made by said condensation determining means.

3. A temperature estimating apparatus for an internal combustion engine according to claim 2, further comprising:

calculation start timing determining means for determining a timing for start calculating the temperature of said exhaust device by said device temperature calculating means in accordance with the result of determination made by said condensation determining means.

4. A temperature estimating apparatus for an internal combustion engine according to claim 1, wherein:

said device temperature calculating means calculates an upstream temperature at a location of said exhaust system upstream of said exhaust device in accordance with the operating condition of said internal combustion engine and the humidity of the exhaust gases, and calculates the temperature of said exhaust device in accordance with the calculated upstream temperature.

5. A temperature estimating apparatus for an internal combustion engine according to claim 1, wherein said exhaust device comprises a hydrocarbon adsorbent for adsorbing hydrocarbons in exhaust gases.

6. A temperature estimating apparatus for an internal combustion engine according to claim 5, further comprising:

desorption determining means for determining whether or not hydrocarbons have been completely desorbed from said hydrocarbon adsorbent in accordance with the temperature of said hydrocarbon adsorbent calculated by said device temperature calculating means.

* * * * *